(12) United States Patent
Tanaka

(10) Patent No.: US 7,375,720 B2
(45) Date of Patent: May 20, 2008

(54) COORDINATE INPUT APPARATUS AND COORDINATE INPUT METHOD

(75) Inventor: Atsushi Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 650 days.

(21) Appl. No.: 10/910,270

(22) Filed: Aug. 4, 2004

(65) Prior Publication Data
US 2005/0041013 A1  Feb. 24, 2005

(30) Foreign Application Priority Data
Aug. 7, 2003  (JP) .............................. 2003-289153

(51) Int. Cl.
*G09G 5/00* (2006.01)
(52) U.S. Cl. ...................... 345/156; 345/173; 345/179
(58) Field of Classification Search ......... 345/179–184
See application file for complete search history.

(56) References Cited

U.S. PATENT DOCUMENTS

| | | | | |
|---|---|---|---|---|
| 4,507,557 A | * | 3/1985 | Tsikos ...................... 250/341.7 |
| 5,933,149 A | * | 8/1999 | Mori et al. ................. 345/442 |
| 6,153,836 A | * | 11/2000 | Goszyk .................... 178/19.01 |
| 6,594,023 B1 | * | 7/2003 | Omura et al. ............... 356/620 |
| 6,714,311 B2 | * | 3/2004 | Hashimoto .................. 356/623 |
| 2001/0050670 A1 | | 12/2001 | Tanaka ........................ 345/156 |
| 2002/0140673 A1 | | 10/2002 | Tanaka ........................ 345/157 |

FOREIGN PATENT DOCUMENTS

| | | |
|---|---|---|
| JP | 2001-084106 | 3/2001 |
| JP | 2002-049466 | 2/2002 |

* cited by examiner

*Primary Examiner*—Bipin Shalwala
*Assistant Examiner*—Afroza Y Chowdhury
(74) *Attorney, Agent, or Firm*—Fitzpatrick, Cella, Harper & Scinto.

(57) ABSTRACT

In a coordinate input apparatus including the detection unit of a sensor unit (1R, 1L) arranged at a corner of a coordinate input region (4), a retroreflecting member (3) arranged at the peripheral portion of the coordinate input region (4) to retroreflect incident light, the light projecting unit of the sensor unit (1R, 1L) which projects light to the coordinate input region (4), and a control/arithmetic unit (2) which executes a coordinate acquisition operation for obtaining the coordinate position of a pointer (6) having a light-emitting function in the coordinate input region (4) on the basis of a light amount distribution obtained from the detection unit of the sensor unit (1R, 1L), a light-receiving IC (5) detects a light emission signal from the pointer (6), and the control/arithmetic unit 2 controls the coordinate acquisition operation on the basis of the detection result.

9 Claims, 29 Drawing Sheets

F I G. 7
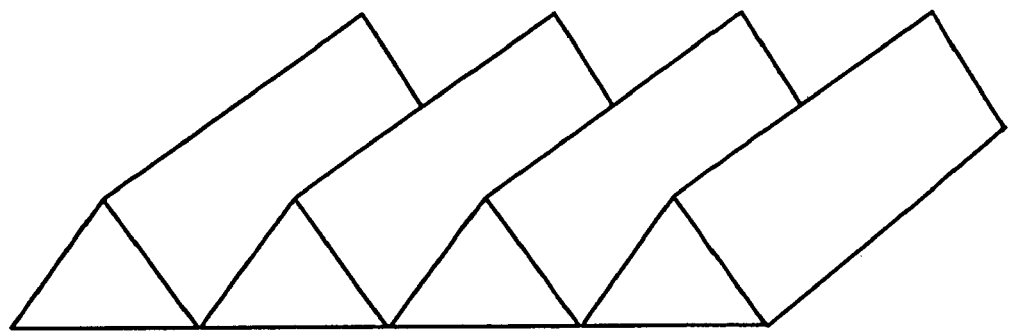

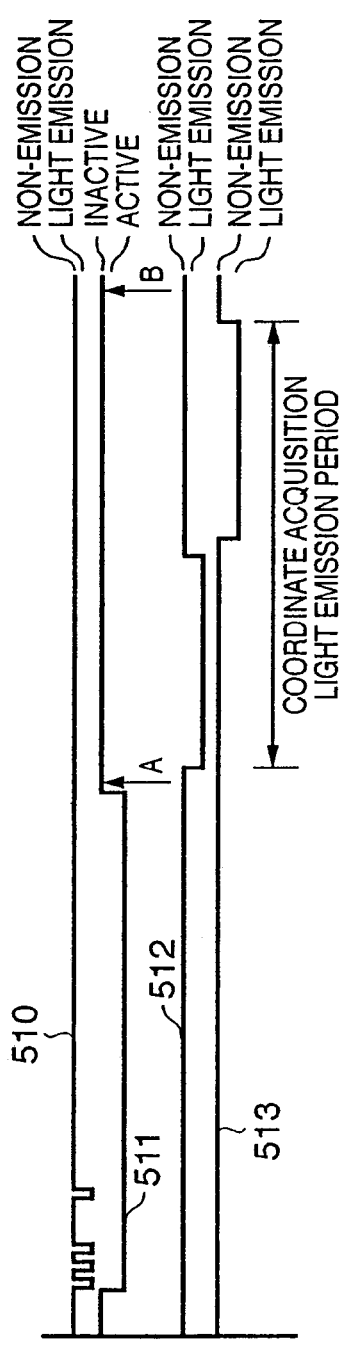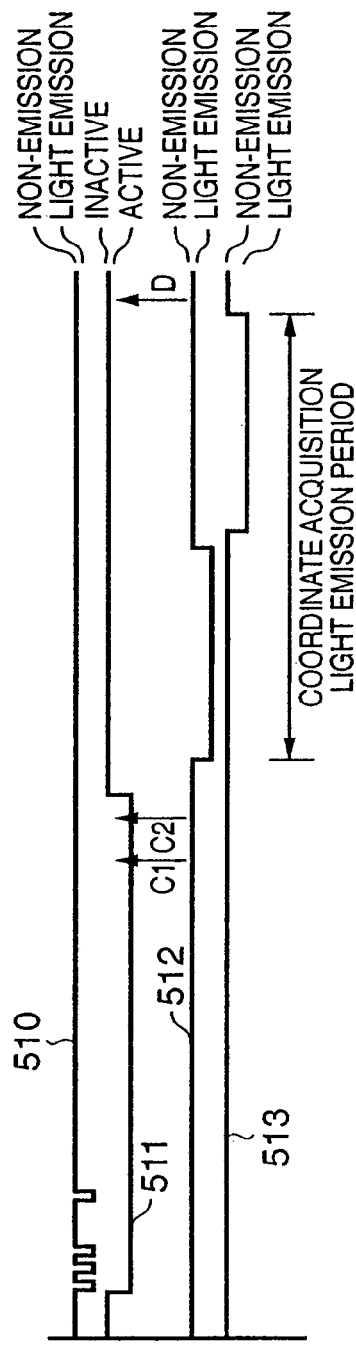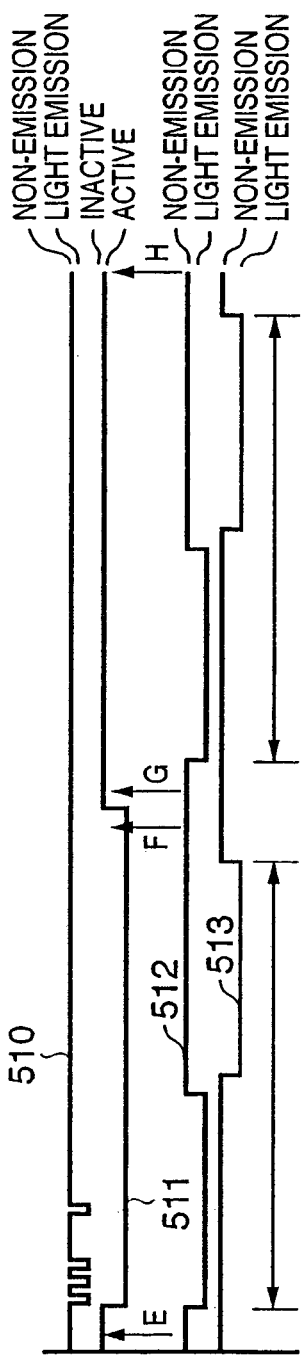

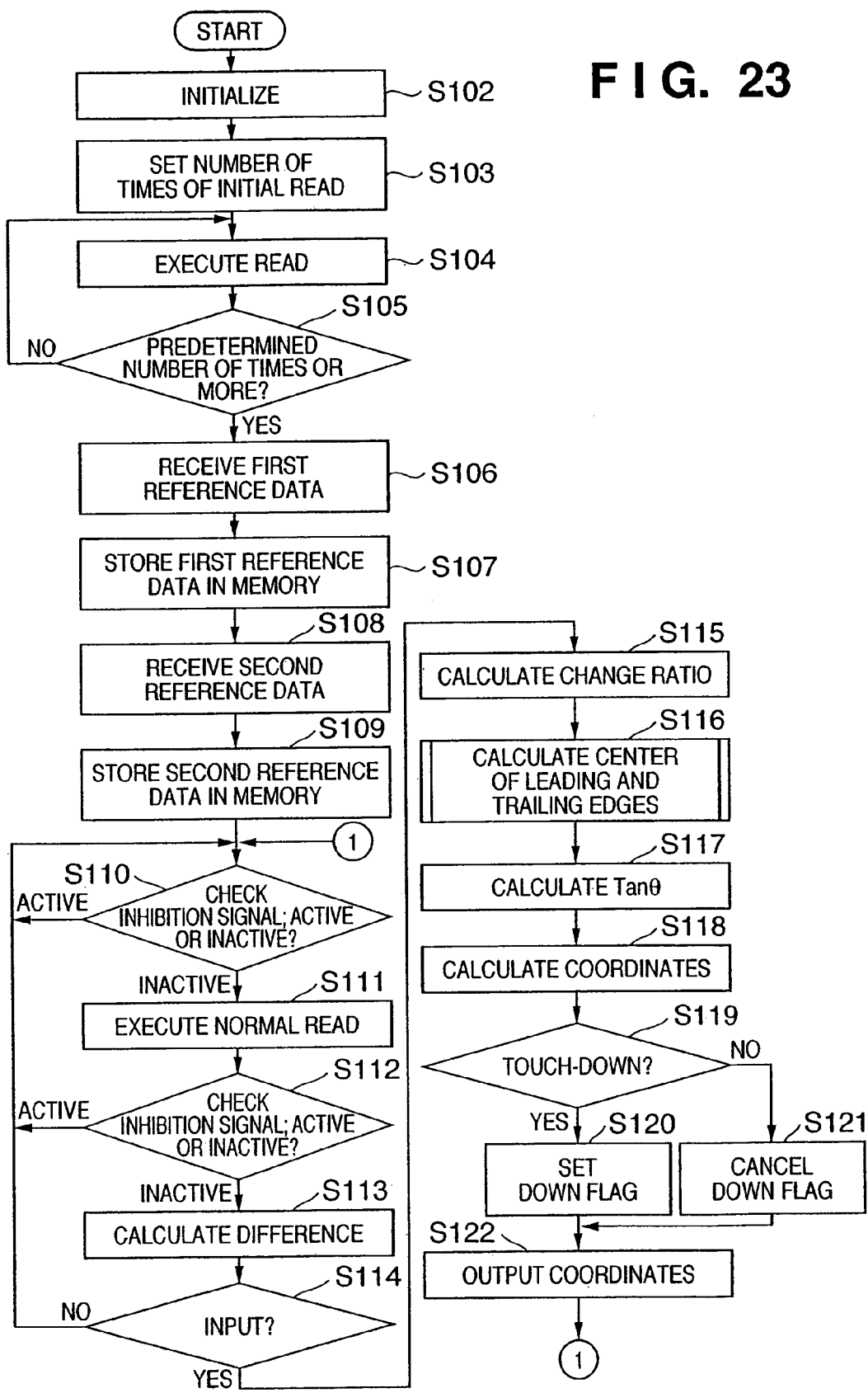
F I G. 23

COORDINATE INPUT APPARATUS AND COORDINATE INPUT METHOD

FIELD OF THE INVENTION

The present invention relates to a technique for inputting coordinates by pointing on an input surface with a pointer or a finger.

BACKGROUND OF THE INVENTION

Conventionally, touch panels of various schemes have been proposed or introduced commercially as apparatuses which input coordinates by pointing on an input surface with a pointer or a finger. The touch panels are widely used because a PC or the like can easily be operated on the screen without using any special tool.

There are various schemes using, e.g., a resistive film or an ultrasonic wave. An apparatus using light is also disclosed (e.g., U.S. Pat. No. 4,507,557). In this apparatus, a retroreflecting sheet is arranged outside the coordinate input surface. Light from a means for illuminating the input surface with light is reflected by the retroreflecting sheet, and a light amount distribution is detected by a light-receiving means. In this arrangement, the angle of a region shielded by a finger or the like in the input region is detected, thereby determining the coordinates of the shielded position, i.e., the input position.

Such a coordinate input apparatus is mounted on the surface of a rear projector or plasma display panel, and a PC window is displayed. Then, a large interactive display capable of operating a PC by a finger or a pointer or inputting the locus of handwriting can be formed.

In such an interactive arrangement, pointing on an icon or the like can easily be done by using a finger or a pointer. However, since the retroreflecting member has a height to some degree, there is an input height to some degree from the screen. When, e.g., a finger is used for input., the finger is detected before it reaches the screen. This poses no so serious problem if a position is simply designated by pointing. However, in inputting characters, dots or lines are connected together, and input is difficult.

As a countermeasure, for example, a plurality of threshold values are set, and the input depth is detected. Only cursor movement is done until the input depth has a predetermined value or more. If it is determined that the input depth has a predetermined value or more, the state is determined as pen-down. In this case, a line is drawn on the screen, or an icon is selected as if the left button of a mouse were clicked on, thereby reducing connection of lines and dots (e.g., Japanese Patent Laid-Open No. 2001-84106).

In this method, however, it is difficult to detect the pen-down state only when proper contact with the screen is obtained. That is, there may be a little difference from human sensation.

An apparatus is disclosed in which to reliably detect contact with the screen, a pointer is used, and a pen-down state is detected in accordance with its contact (e.g., Japanese Patent Laid-Open No. 2002-49466). In this method, the position pointing means on the pen uses a movable point. The light reflection characteristic is changed by moving the pen point, thereby obtaining pen-down information.

When this method is used, the pen-down state can be detected in accordance with contact with the screen. However, since the state is represented mechanically, it is difficult to send to the main body other pieces of information of the pointer, including, e.g., information corresponding to the right button of a mouse and information that represents the ID of a pen to cope with such an application that changes the pen color.

Other information may be sent by using an electromagnetic wave, infrared radiation, or ultrasonic wave. However, when a switch signal is transmitted by using an ultrasonic wave, reflection from objects around the device may occur in some device installation state so the reliability may be low. When an ultrasonic wave or electromagnetic wave is used, and devices are placed side by side, interference between adjacent devices may occur.

A method using infrared radiation can suitably be used for transmission/reception of various kinds of information such as pen-down information, side switch information, and ID information. In this method, even when reflection occurs, no problem is posed because the speed of infrared radiation is high. Even when devices are installed side by side, they can be shielded from each other by a very simple structure.

The above-described coordinate input apparatuses using retroreflection rarely use visible light that can disturb display. They also often use infrared light for coordinate detection. In this case, the light-receiving means in the imaging optical system for coordinate detection and the light-receiving means in the condensing optical system that receives the information of the pointer detect each other's light. For example, assume that during detection of reflected light from the retroreflecting member, the pointer emits light to transmit information near the light-receiving means in the imaging optical system for coordinate detection. At this time, the detection unit in the imaging optical system may detect the light, and a coordinate detection error may occur. Alternatively, if light from the pointer is strong, the light-receiving element in the imaging system may be saturated, and detection may become impossible.

Even when the condensing optical system which detects the optical signal from the pointer is designed not to directly face the light source for coordinate detection, light for coordinate detection may be reflected by a finger or the pointer near the light-receiving element in the condensing optical system and detected. In this case, no correct information can be obtained from the pointer.

SUMMARY OF THE INVENTION

The present invention has been made in consideration of the above problem, and has as its object to accurately detect coordinates.

In order to achieve the above object, for example, a coordinate input apparatus of the present invention comprises the following arrangement.

That is, a coordinate input apparatus including light-receiving means arranged in a coordinate input region, reflection means, arranged at a peripheral portion of the coordinate input region, for reflecting incident light, light-emitting means for projecting light to the coordinate input region, and calculation means for executing a coordinate acquisition operation for obtaining a coordinate position of a pointer having a light-emitting function in the coordinate input region on the basis of a light amount distribution obtained from the light-receiving means, comprises:

detection means for detecting a light emission signal from the pointer; and control means for controlling the coordinate acquisition operation by the calculation means on the basis of a detection result by the detection means.

In order to achieve the above object, for example, a coordinate input method of the present invention comprises the following arrangement.

That is, a coordinate input method of a coordinate input apparatus including light-receiving means arranged in a coordinate input region, reflection means, arranged at a peripheral portion of the coordinate input region, for reflecting incident light, light-emitting means for projecting light to the coordinate input region, and calculation means for executing a coordinate acquisition operation for obtaining a coordinate position of a pointer having a light-emitting function in the coordinate input region on the basis of a light amount distribution obtained from the light-receiving means, comprises:

a detection step of detecting a light emission signal from the pointer; and a control step of controlling the coordinate acquisition operation by the calculation means on the basis of a detection result in the detection step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7 is a view showing an arrangement example of the retroreflecting member according to the first embodiment of the present invention;

FIG. 22A is a timing chart for explaining control processing for preventing overlap of a period during which a pen light emission signal is output and a period during which the light projecting unit of the sensor unit projects light;

FIG. 22B is a timing chart for explaining control processing for preventing overlap of a period during which a pen light emission signal is output and a period during which the light projecting unit of the sensor unit projects light;

FIG. 22C is a timing chart for explaining control processing for preventing overlap of a period during which a pen light emission signal is output and a period during which the light projecting unit of the sensor unit projects light;

FIG. 23 is a flowchart of processing for causing the coordinate input apparatus according to the first embodiment of the present invention to obtain the coordinate position of the pointer;

DETAILED DESCRIPTION OF THE PREFERRED EMBODIMENTS

Preferred embodiments of the present invention will be described in detail in accordance with the accompanying drawings.

First Embodiment

Figure 1:
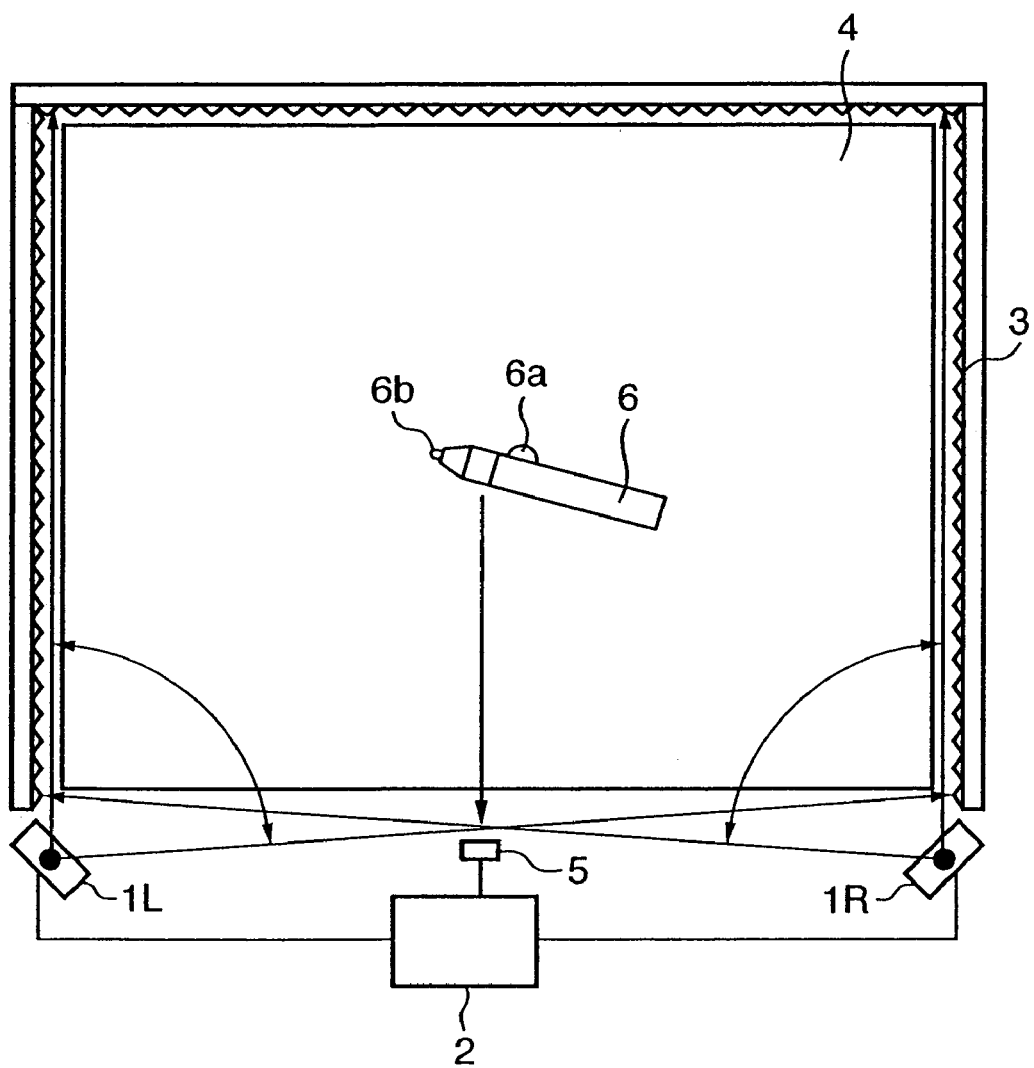
FIG. 1 is a view showing the arrangement of a coordinate input apparatus according to the first embodiment of the present invention.
Figure 5:
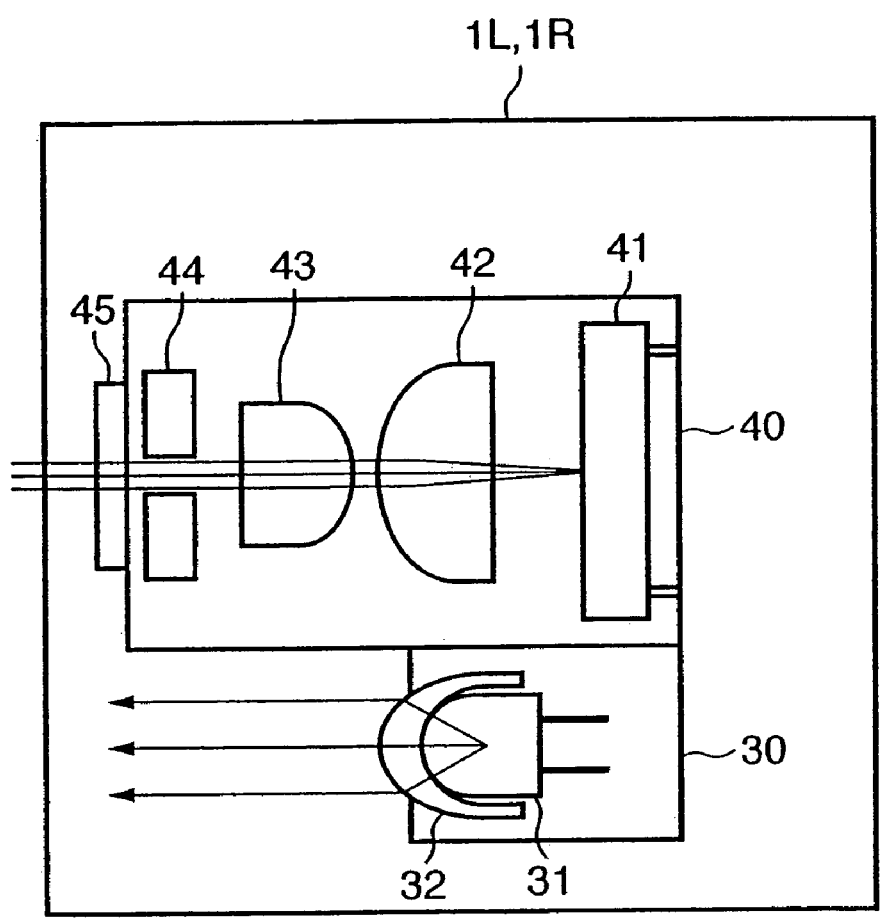
FIG. 5 is a view showing an arrangement example of the sensor unit according to the first embodiment of the present invention.

FIG. 1 is a view showing the arrangement of a coordinate input apparatus according to this embodiment. Referring to FIG. 1, each of sensor units 1L and 1R has a light projecting unit 30 and a detection unit 40 (FIG. 5). The sensor units 1L and 1R are separated by a predetermined distance. The sensor units 1L and 1R are connected to a control/arithmetic unit 2 which executes a control/arithmetic operation to receive control signals from the control/arithmetic unit 2 and transmit detected signals to the control/arithmetic unit 2.

Figure 2:
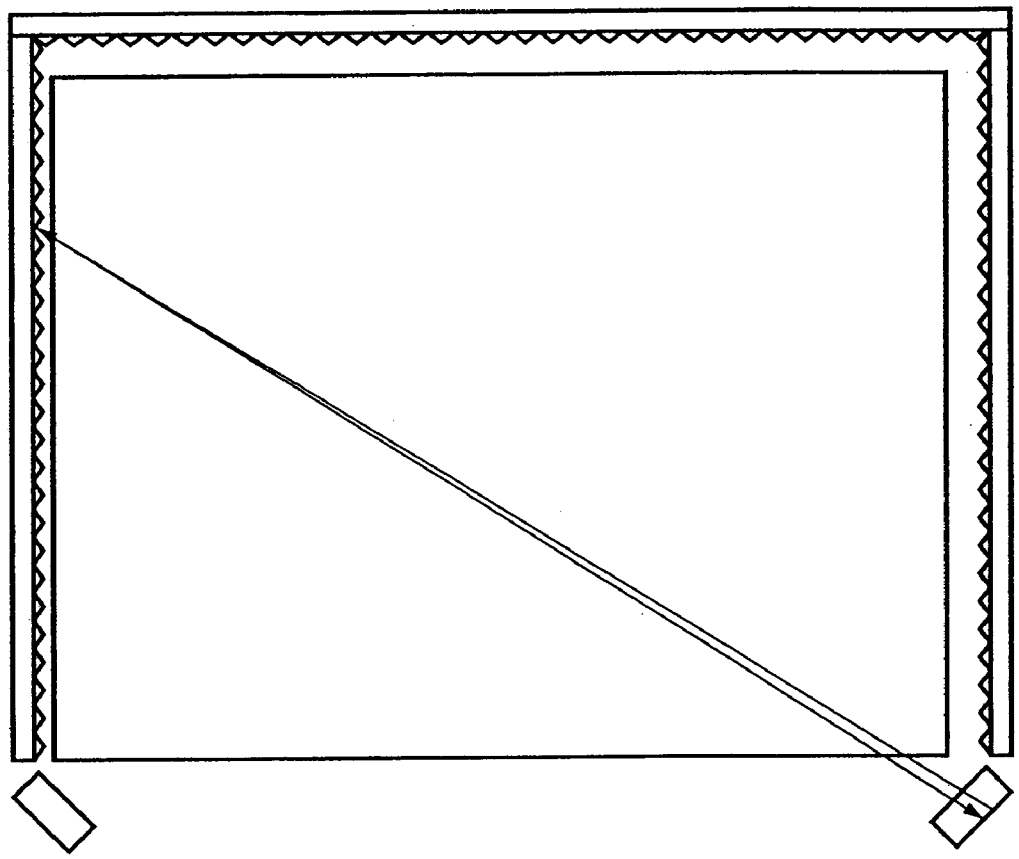
FIG. 2 is a view for explaining the operation of the retroreflecting member according to the first embodiment of the present invention.

A retroreflecting member 3 has a retroreflecting surface which reflects incident light to the arrival direction, as shown in FIG. 2. The retroreflecting member 3 retroreflects light projected from the sensor units 1L and 1R on the left and right sides within a range of about 90° toward the sensor units 1L and 1R. The reflected light is one-dimensionally detected by each of the sensor units 1L and 1R each of which includes an imaging optical system and line CCD. The light amount distribution is transmitted to the control/arithmetic unit 2.

A coordinate input region 4 includes a display screen of a display device such as a PDP, rear projector, or LCD panel and can be used as an interactive input device.

In this arrangement, when input pointing by a pointer such as a finger is done in the coordinate input region 4, light projected from the light projecting units 30 of the sensor units 1L and 1R is shielded. Since reflected light by the retroreflecting member 3 is not obtained, no reflected light amount is obtained at only the input pointed position.

The control/arithmetic unit 2 detects the light-shielded range of the portion input-pointed by the pointer from the light amount change detected by the sensor units 1L and 1R. The control/arithmetic unit 2 specifies the detection point in the light-shielded range and calculates the angles of the pointer with respect to the sensor units 1L and 1R. On the basis of the calculated angles and the distance between the sensor units, the control/arithmetic unit 2 calculates the pointing position of the pointer on the coordinate input region 4 and outputs the coordinate values to an external terminal such as a personal computer connected to the display device through an interface such as USB.

When not a finger but a dedicated input pointer having, e.g., a pen-down detection switch is used, input without any smear can be performed. A light-emitting pen 6 shown in FIG. 1 is an example of such an input pointer. When a pen point switch 6b or a switch 6a arranged on a pen side is pressed, an infrared LED (not shown) incorporated in the light-emitting pen 6 emits light to transmit switch information.

The emitted optical signal is detected by a light-receiving IC 5 having a condensing optical system. The detection result is transmitted to the control/arithmetic unit 2. The control/arithmetic unit 2 outputs the pen-down information or the like to an external device such as a PC together with the coordinate information of the light-emitting pen 6. Accordingly, the PC can be operated by drawing a line or character on the screen of the PC or operating an icon.

<Detailed Description of Sensor Unit>

The arrangement of the light projecting unit 30 in each of the sensor units 1L and 1R will be described first with reference to FIGS. 3A and 3B.

Figure 3A:
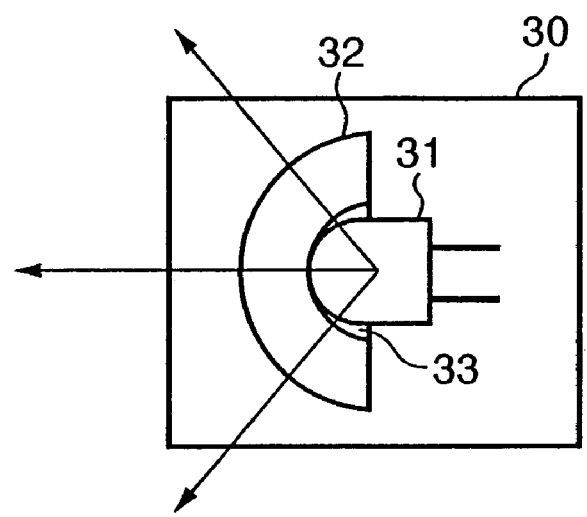
FIG. 3A is a view showing a light projecting unit 30 viewed from the upper side (from a direction perpendicular to the input surface of the coordinate input region 4)

FIG. 3A is a view showing the light projecting unit 30 viewed from the upper side (from a direction perpendicular to the input surface of the coordinate input region 4). An infrared LED 31 emits infrared light. The light emitted from the infrared LED 31 is projected in a range of about 90° by a light projecting lens 32.

Figure 3B:
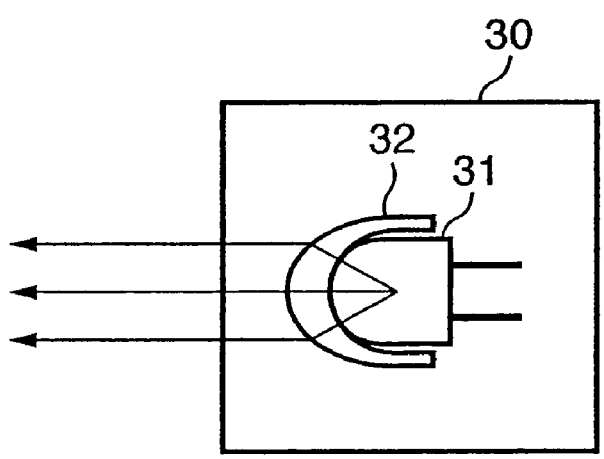
FIG. 3B is a view showing the light projecting unit 30 viewed from a side (from a direction parallel to the input surface of the coordinate input region 4)

FIG. 3B is a view showing the light projecting unit 30 viewed from a side (from a direction parallel to the input surface of the coordinate input region 4). In this direction, the light from the infrared LED 31 is projected as a light beam limited in the vertical direction so that the light is mainly projected to the retroreflecting member 3.

The arrangement of the detection unit 40 in each of the sensor units 1L and 1R will be described next with reference to FIG. 4.

Figure 4:
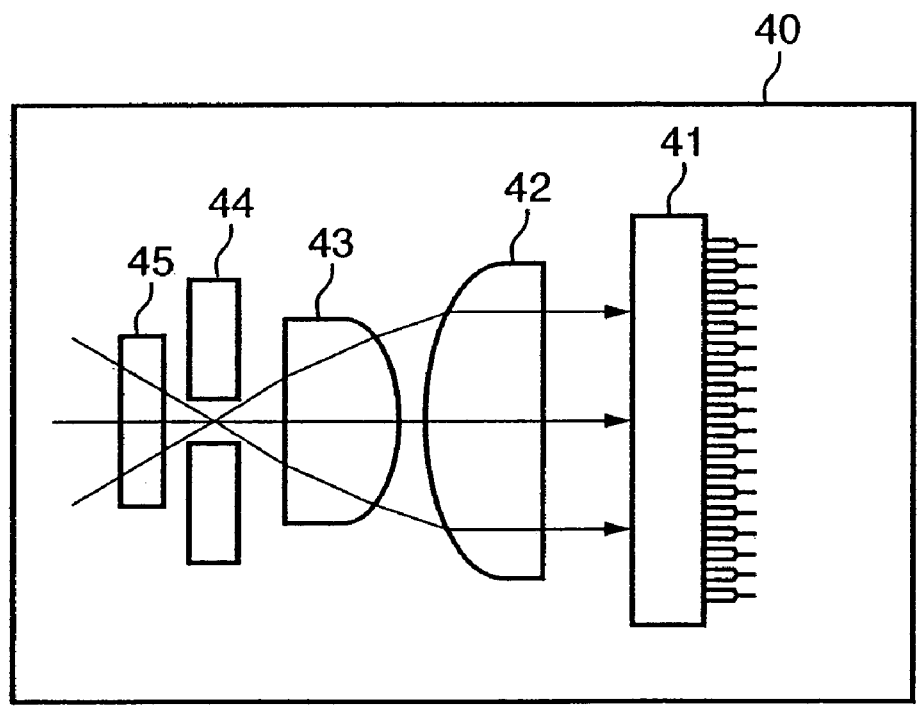
FIG. 4 is a view showing an arrangement example of the detection unit of the sensor unit according to the first embodiment of the present invention.

FIG. 4 is a view showing an arrangement example of the detection unit of the sensor unit according to this embodiment. FIG. 4 shows the detection unit 40 in each of the sensor units 1L and 1R from a direction perpendicular to the input surface of the coordinate input region 4.

The detection unit 40 includes a one-dimensional line CCD 41 including a plurality of light-receiving elements (pixels), condenser lenses 42 and 43 serving as a condenser optical system, a stop 44 which limits the direction of incidence of incident light, and an infrared filter 45 which prevents incidence of extra light such as visible light.

Light from the light projecting unit 30 is reflected by the retroreflecting member 3 and passes through the infrared filter 45 and stop 44. An image of light in the range of about 90° on the input surface is formed on pixels of the detection surface of the line CCD 41 depending on the incident angle by the condenser lenses 42 and 43. This makes it possible to obtain a light amount distribution for each incident angle. That is, the pixel numbers of pixels of the line CCD 41 represent angle information.

The arrangement of each of the sensor units 1L and 1R each having the light projecting unit 30 shown in FIGS. 3A and 3B and the detection unit 40 shown in FIG. 4 will be described next with reference to FIG. 5.

FIG. 5 is a view showing an arrangement example of the sensor unit according to this embodiment.

FIG. 5 shows the sensor unit 1L (1R) in which the light projecting unit 30 shown in FIG. 3A and the detection unit 40 shown in FIG. 4 are stacked and viewed from the direction parallel to the input surface. The distance between the optical axis of the light projecting unit 30 and that of the detection unit 40 is set to a sufficiently detectable range on the basis of the angle characteristic of the retroreflecting member 3.

<Reflecting Member>

Figure 6:
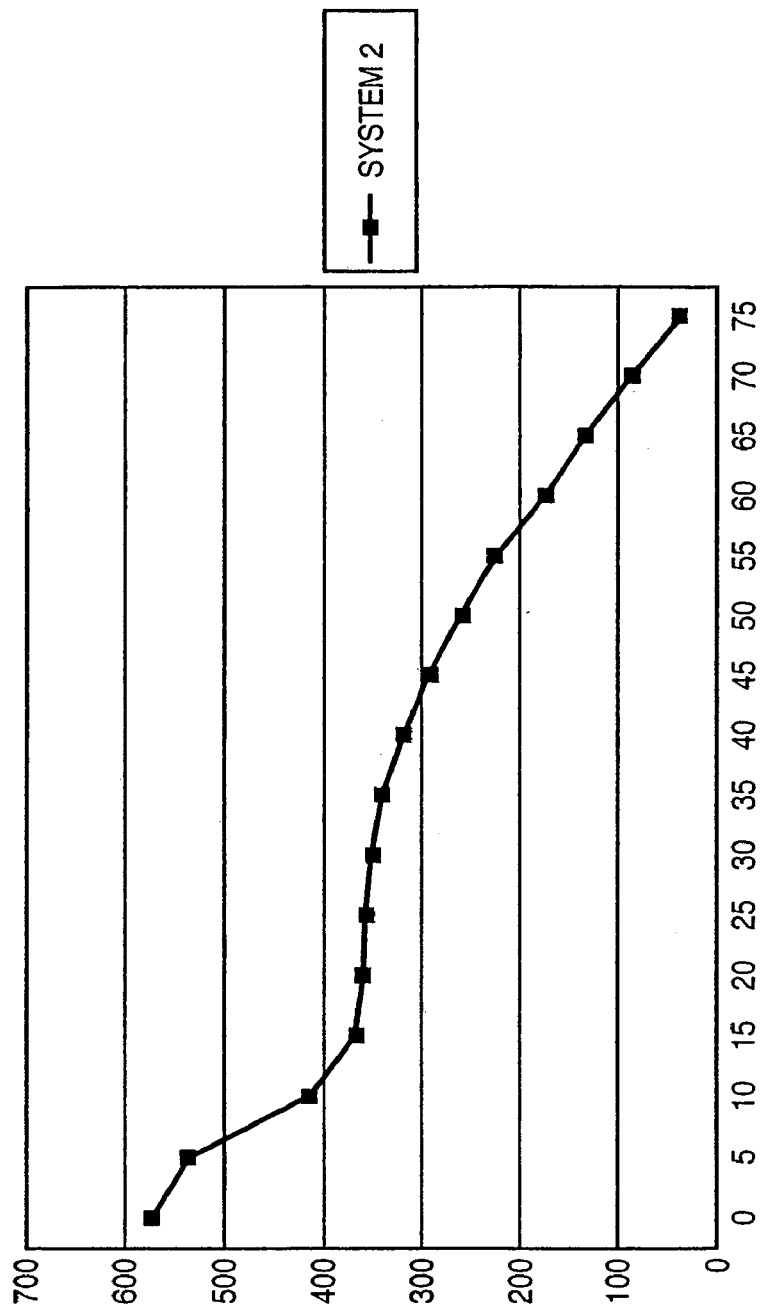
FIG. 6 is a graph showing the retroreflection characteristic for an incident angle to the retroreflecting member according to the first embodiment of the present invention.

The retroreflecting member 3 has a reflecting characteristic to an incident angle. As the reflecting characteristic, for example, when the retroreflecting member 3 has a flat tape shape, the reflected light amount decreases nearly when the incident angle of incident light on the retroreflecting member 3 exceeds 45°, as shown in FIG. 6. When the pointer is present, the change in light amount cannot sufficiently be ensured.

The reflected light amount is determined by the light amount distribution (illumination intensity and distance), the reflectance of the retroreflecting member 3 (incident angle and reflecting member width), and the imaging system illuminance in the sensor units 1L and 1R (cosine fourth law).

To solve a shortage of reflected light amount, the illumination intensity of the light projecting unit 30 is increased. However, when the reflected light amount distribution is not uniform, and light of a large light amount portion is received by the sensor unit, that portion may be saturated in the line CCD 41 in the sensor unit. Hence, there is a limitation on the increase in illuminance intensity. In other words, when the reflected light amount distribution of the retroreflecting member 3 is made as uniform as possible, the increase in reflected light amount to a small light amount portion can be expected.

In this embodiment, to uniform the reflected light amount of incident light on the retroreflecting member 3 to the incident angle direction, a retroreflecting member including a plurality of triangular prisms as shown in FIG. 7 is used. Accordingly, the reflecting characteristic to the incident angle can be improved.

The angle of each triangular prism is determined from the reflecting characteristic of the retroreflecting member. The pitch of the triangular prisms is preferably set to be equal to or less than the detection resolution of the line CCD 41 in the sensor unit.

<Description of Control/Arithmetic Unit>

The control/arithmetic unit 2 and each of the sensor units 1L and 1R mainly exchange a CCD control signal, a CCD clock signal, and an output signal for the line CCD 41 in the detection unit 40 and a driving signal for the infrared LED 31 of the light projecting unit 30.

The detailed arrangement of the control/arithmetic unit 2 will be described with reference to FIG. 8.

Figure 8:
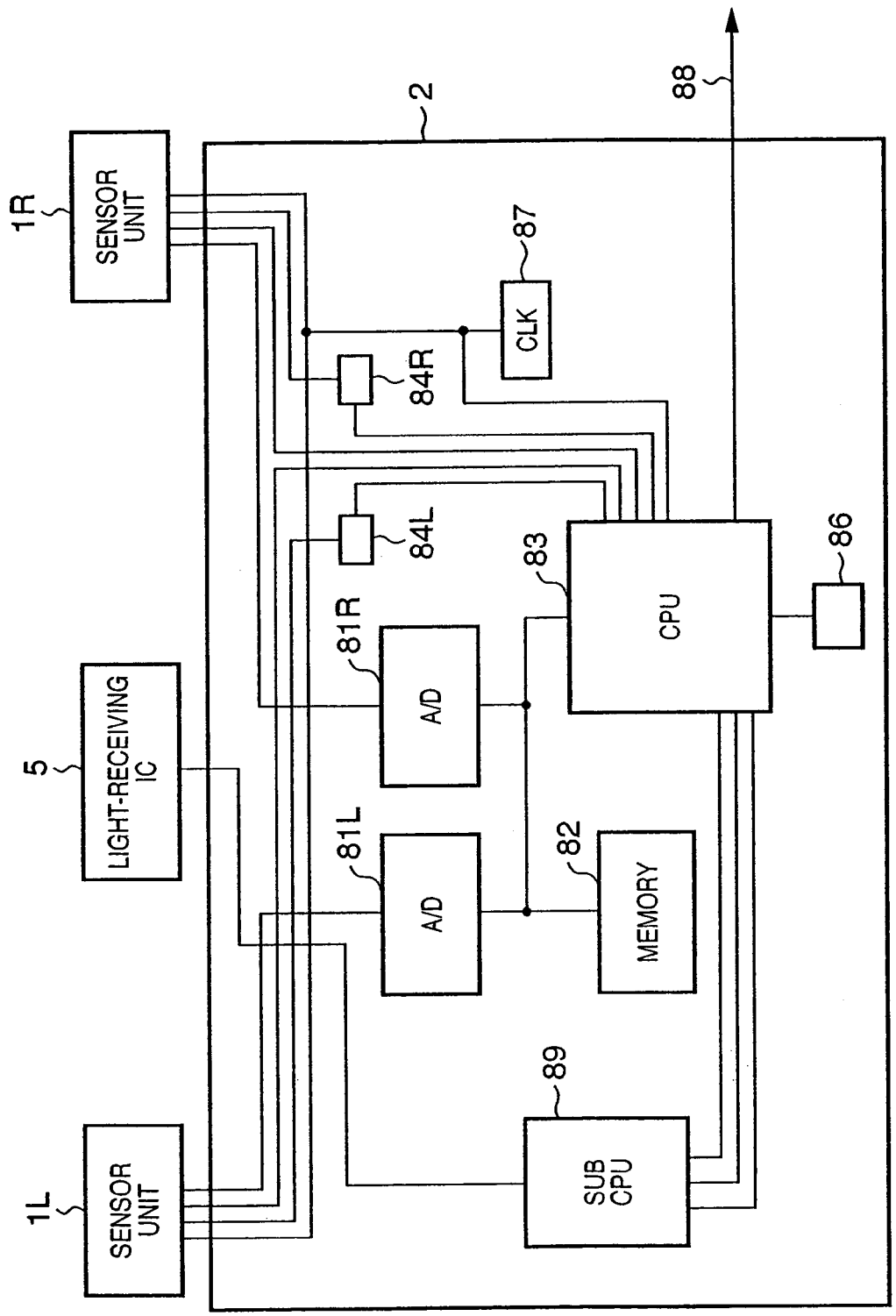
FIG. 8 is a block diagram showing the detailed arrangement of the control/arithmetic unit according to the first embodiment of the present invention.

FIG. 8 is a block diagram showing the detailed arrangement of the control/arithmetic unit according to this embodiment.

The CCD control signal is output from an arithmetic control circuit (CPU) 83 including a one-chip microcomputer or the like to control the shutter timing of the line CCD 41 or execute data output control. A CCD clock signal is transmitted from a clock generation circuit (CLK) 87 to the sensor units 1L and 1R and also input to the arithmetic control circuit 83 to execute various kinds of control in synchronism with the line CCD 41 in each sensor unit.

An LED driving signal to drive the infrared LED 31 in each light projecting unit 30 is supplied from the arithmetic control circuit 83 to the infrared LED 31 of a corresponding one of the sensor units 1L and 1R through an LED driving circuit 84L or 84R.

A detection signal from the line CCD 41 in the detection unit 40 of each of the sensor units 1L and 1R is input to a corresponding one of the A/D converters 81L and 81R of the control/arithmetic unit 2 and converted into a digital value under the control of the control/arithmetic unit 2. The converted digital value is stored in a memory 82 and used for angle calculation for the pointer. Coordinate values are calculated from the calculated angle and output to an external terminal through a serial interface 88 (e.g., a USB or RS232C interface).

The light-receiving IC 5 to receive the signal from the light-emitting pen 6 outputs a digital signal obtained by demodulating the modulated signal from the light-emitting pen 6. The digital signal is input to a sub CPU 89 which functions as a pen switch signal detection circuit. The signal is analyzed, and information representing the analysis result is transmitted to the arithmetic control circuit 83.

<Description of Light Amount Distribution Detection>

Figure 9:
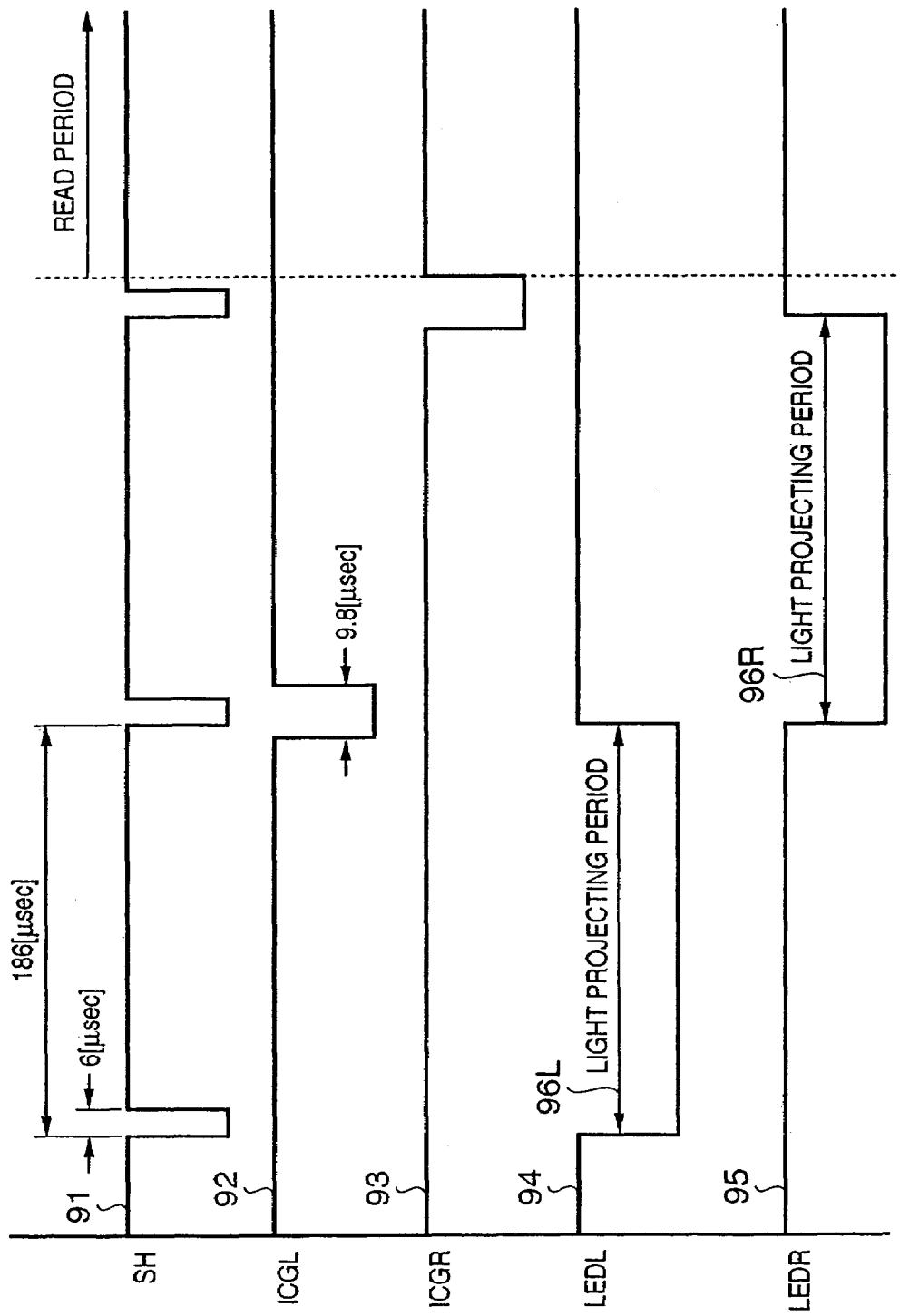
FIG. 9 is a timing chart of control signals according to the first embodiment of the present invention.

FIG. 9 is a timing chart of control signals according to this embodiment.

Referring to FIG. 9, reference numerals 91 to 93 denote CCD control signals. The shutter release time of the line CCD 41 is determined by the interval of the SH signal 91. The ICGL signal 92 and ICGR signal 93 are gate signals to the sensor units 1L and 1R. Each of the signals transfers charges in the photoelectric conversion unit of the line CCD 41 to the read unit.

Reference numerals 94 and 95 denote driving signals for the light projecting units 30 of the sensor units 1L and 1R. To turn on the light projecting unit 30 of the sensor unit 1L at the first period of the SH signal 91 (light projecting period 96L), the LEDL signal 94 is supplied to the light projecting unit 30 through the LED driving circuit 84L. To turn on the light projecting unit 30 of the sensor unit 1R at the next period of the SH signal 91 (light projecting period 96R), the LEDR signal 95 is supplied to the light projecting unit 30 through the LED driving circuit 84R.

After driving of the light projecting units 30 in both the sensor units 1L and 1R is ended, detection signals from the detection units (line CCDs 41) of both the sensor units 1L and 1R are read out.

Figure 10:
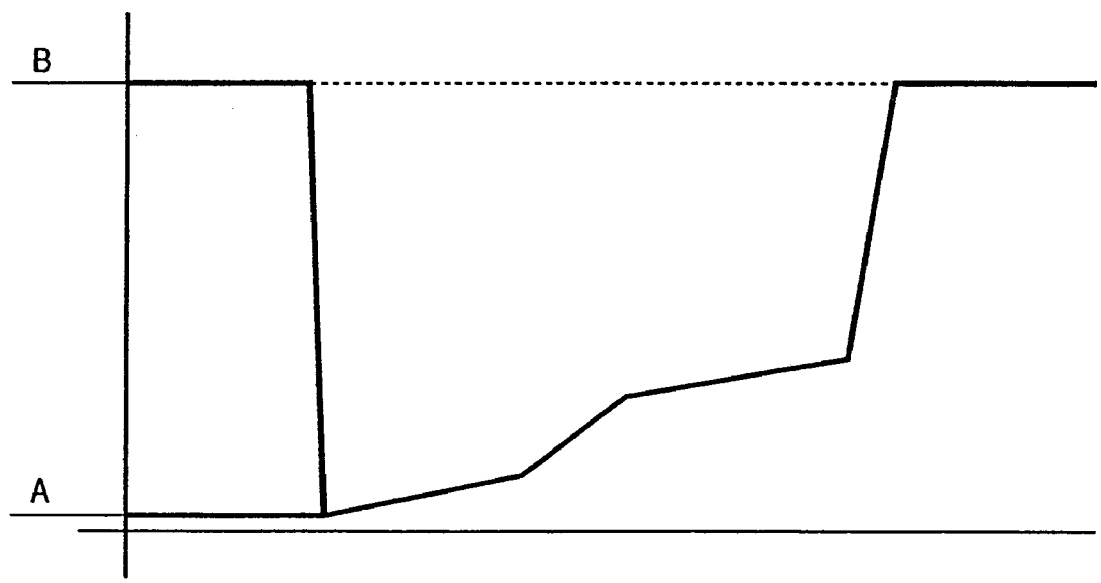
FIG. 10 is a graph showing an example of the light amount distribution obtained by the sensor unit according to the first embodiment of the present invention.

When input by the pointer to the coordinate input region 4 is not executed, the detection signals read out from both the sensor units 1L and 1R have a light amount distribution shown in FIG. 10 as the outputs from the sensor units. Such a light amount distribution is not always obtained in all systems. The light amount distribution changes depending on the characteristic of the retroreflecting member 3, the characteristic of the light projecting unit 30, or a change over time (e.g., dirt on the reflecting surface).

Referring to FIG. 10, a level A is the maximum light amount, and a level B is the minimum light amount.

More specifically, when no reflected light is obtained from the retroreflecting member 3, the light amount level obtained by the sensor units 1L and 1R is almost the level B. As the reflected light amount increases, the light amount level is transited to the level A. Detection signals thus output from the sensor units 1L and 1R are A/D-converted by the A/D converters 81L and 81R and received by the control/arithmetic unit 2 as digital data.

Figure 11:
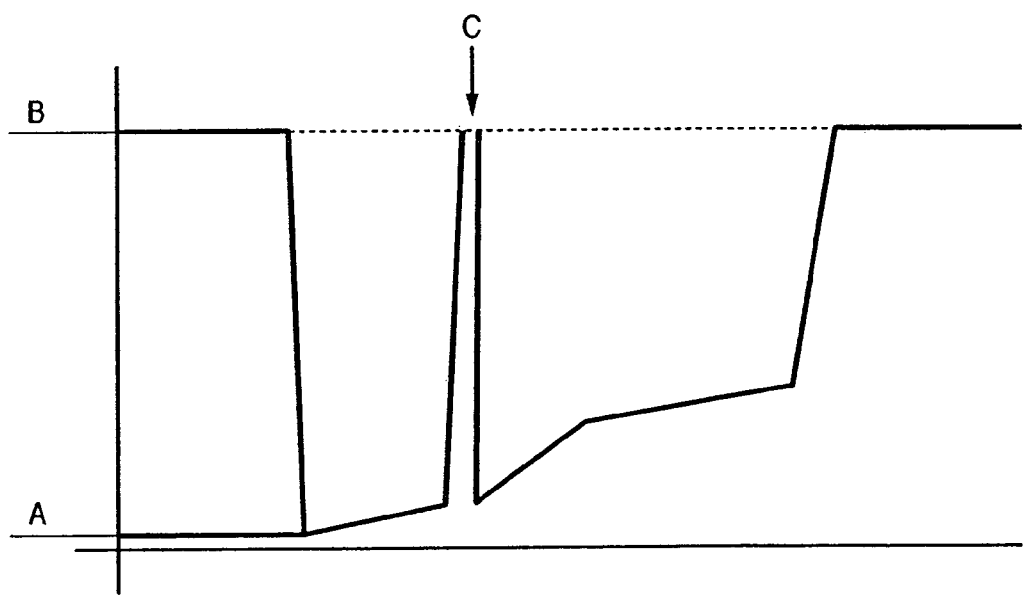
FIG. 11 is a graph showing an example of the light amount distribution obtained by the sensor unit when input according to the first embodiment of the present invention is done.

To the contrary, when input by the pointer to the coordinate input region 4 is executed, a light amount distribution shown in FIG. 11 is obtained as the outputs from the sensor units 1L and 1R.

Reflected light from the retroreflecting member 3 is shielded by the pointer at a portion C of the light amount distribution. As is apparent from FIG. 11, the reflected light amount decreases at only that portion (light-shielded range).

In this embodiment, the angles of the pointer with respect to the sensor units 1L and 1R are calculated on the basis of the change between the light amount distribution shown in FIG. 10 when input by the pointer is not executed and the light amount distribution shown in FIG. 11 when input by the pointer is executed.

More specifically, the light amount distribution shown in FIG. 10 is stored in the memory 82 as an initial state in advance. It is detected on the basis of the difference between the light amount distribution during the sample period and that in the initial state whether the change in light amount distribution as shown in FIG. 11 is obtained during the sample period of the detection signal of each of the sensor units 1L and 1R. If the light amount distribution has changed, calculation to determine the input angle is executed by using the change portion as the input point of the pointer.

<Description of Angle Calculation>

In calculating the angles of the pointer with respect to the sensor units 1L and 1R, the light-shielded range by the pointer must be detected first.

As described above, the light amount distribution detected by each of the sensor units 1L and 1R is not constant because of factors such as a change over time. The light amount distribution in the initial state is preferably stored in the memory 82, e.g., every time the system is activated. Accordingly, except a case wherein, e.g., the retroreflecting surface of the retroreflecting member 3 is dusty and cannot completely reflect light, the light amount distribution in the latest initial state of the coordinate input apparatus can be managed in the memory 82.

Angle calculation of the pointer by one of the sensor units 1L and 1R (e.g., the sensor unit 1L) will be described below. The same angle calculation is executed by the other sensor unit (sensor unit 1R), as a matter of course.

At the time of power-on, in a state without input and in a state wherein light projection from the light projecting unit 30 in the sensor unit 1L is stopped, the light amount distribution as the output from the detection unit 40 is A/D-converted. The value is stored in the memory 82 as Bas_data[N].

This value is data containing a bias variation or the like of the detection unit (line CCD 41) and is present near the level B in FIG. 10. N indicates the pixel number of a pixel of the line CCD 41. Pixel numbers corresponding to the effective input range (effective range) are used.

Next, in a state wherein light projection from the light projecting unit 30 is executed, the light amount distribution as the output from the detection unit 40 is A/D-converted. The value is stored in the memory 82 as Ref_data[N].

This value is, e.g., data indicated by the solid line in FIG. 10.

Using Bas_data[N] and Ref_data[N] stored in the memory 82, the presence/absence of input by the pointer and the presence/absence of a light-shielded range are determined.

The pixel data of an nth pixel during the sample period of the output of the sensor unit 1L (line CCD 41) is indicated by Norm_data[N].

First, to specify the light-shielded range, the presence/absence of a light-shielded range is determined on the basis of the absolute amount of a change in pixel data. This processing is done in order to prevent any determination error by noise and detect a proper change in predetermined amount.

More specifically, the absolute amount of a change in pixel data is calculated in each pixel of the line CCD 41 and compared with a threshold value Vtha determined in advance.

$$\text{Norm\_data\_a}[N] = \text{Norm\_data}[N] - \text{Ref\_data}[N] \quad (1)$$

where Norm_data_a[N] is the absolute change amount in each pixel of the line CCD 41.

In this processing, the absolute change amount Norm_data_a[N] in each pixel of the line CCD 41 is only calculated and compared with the threshold value Vtha. Hence, no long processing time is necessary, and the presence/absence of input can be determined at a high speed. Especially, when the number of pixels whose change amounts are more than the threshold value Vtha exceeds a predetermined number, it is determined that input by the pointer is present.

A method will be described next with reference to FIG. 12 in which to more accurately detect input by the pointer, an input point is determined by calculating the pixel data change ratio.

Figure 12:
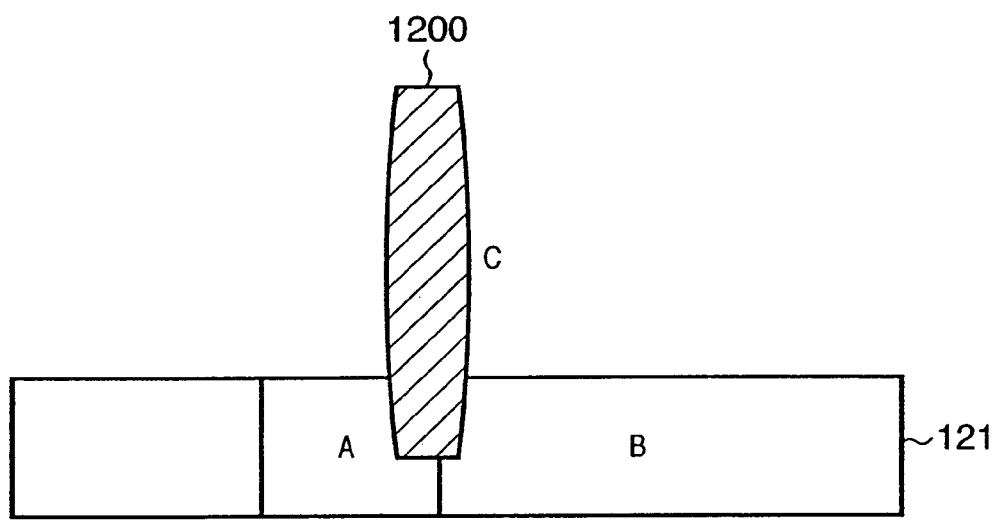
FIG. 12 is a view for explaining a method of determining an input point according to the first embodiment of the present invention.
Figure 13A:
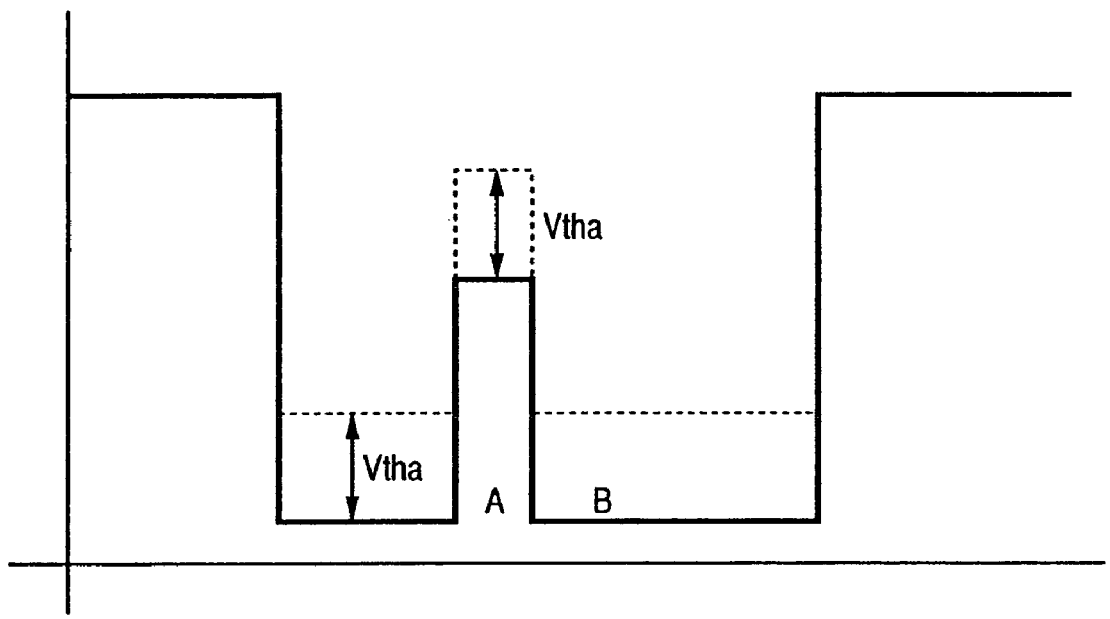
FIG. 13A is a graph for explaining a change in light amount in the light amount distribution obtained by the sensor unit according to the first embodiment of the present invention.
Figure 13B:
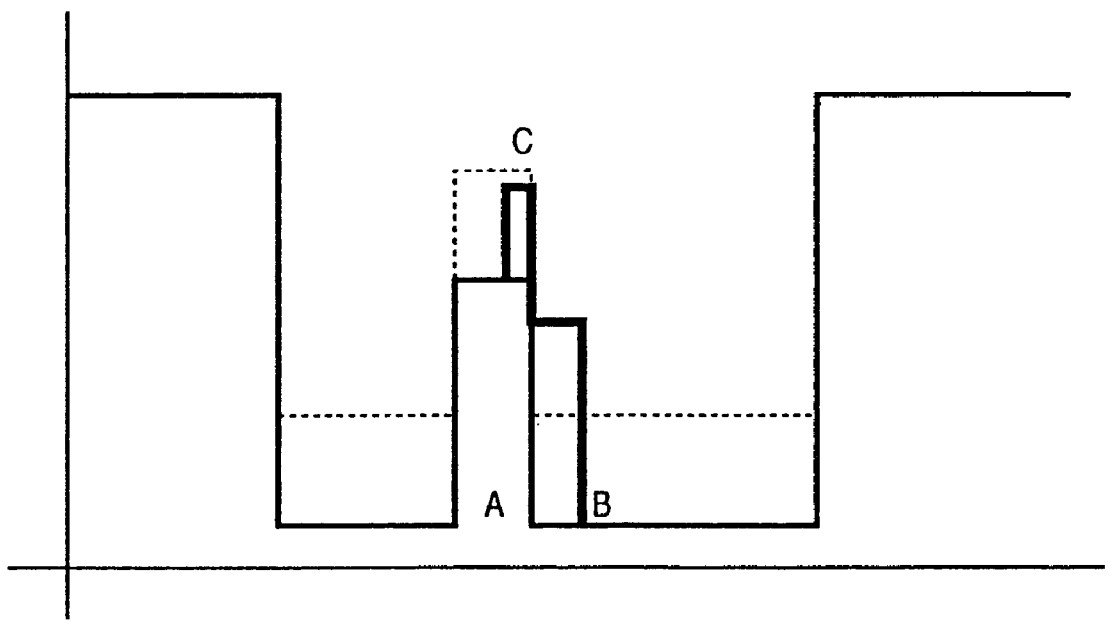
FIG. 13B is a graph for explaining a change in light amount in the light amount distribution obtained by the sensor unit according to the first embodiment of the present invention.

Referring to FIG. 12, reference numeral 121 denote the retroreflecting surface of the retroreflecting member 3. Assume that the reflectance in a region A is low because of dirt or the like. As for the pixel data distribution (light amount distribution) of Ref_data[N] at this time, the reflected light amount is small at a portion corresponding to the region A, as shown in FIG. 13A. When a pointer 1200 is inserted and almost covers the upper half portion of the retroreflecting surface 121 in this state, as shown in FIG. 12, the reflected light amount is almost halved. Hence, Norm_data[N] indicated by the bold line in FIG. 13B is observed.

Figure 14A:
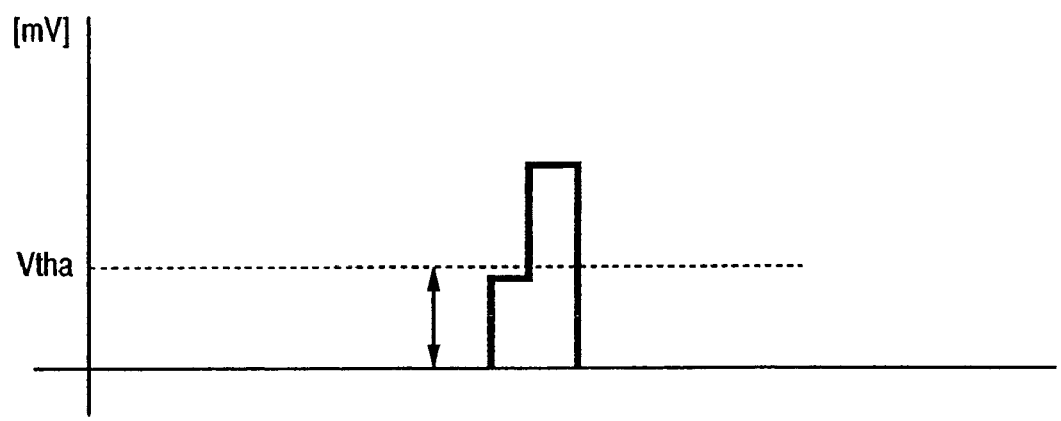
FIG. 14A is a graph for explaining the light amount change amount and light amount change ratio in the light amount distribution obtained by the sensor unit according to the first embodiment of the present invention.

When equation (1) is applied to this state, a pixel data distribution shown in FIG. 14A is obtained. The ordinate represents the differential voltage from the initial state.

When the threshold value Vtha is applied to this pixel data, it may be impossible to detect the actual input range. When the threshold value Vtha is made small, the input range can be detected to some extent, though there may be the influence of noise.

To prevent this, the pixel data change ratio is calculated. In both the region A and a region B, the reflected light amount is ½ that in the initial state. Hence, the ratio can be calculated by $$\text{Norm\_data\_r}[N] = \text{Norm\_data\_a}[N]/(\text{Bas\_data}[N] - \text{Ref\_data}[N]) \quad (2)$$

Figure 14B:
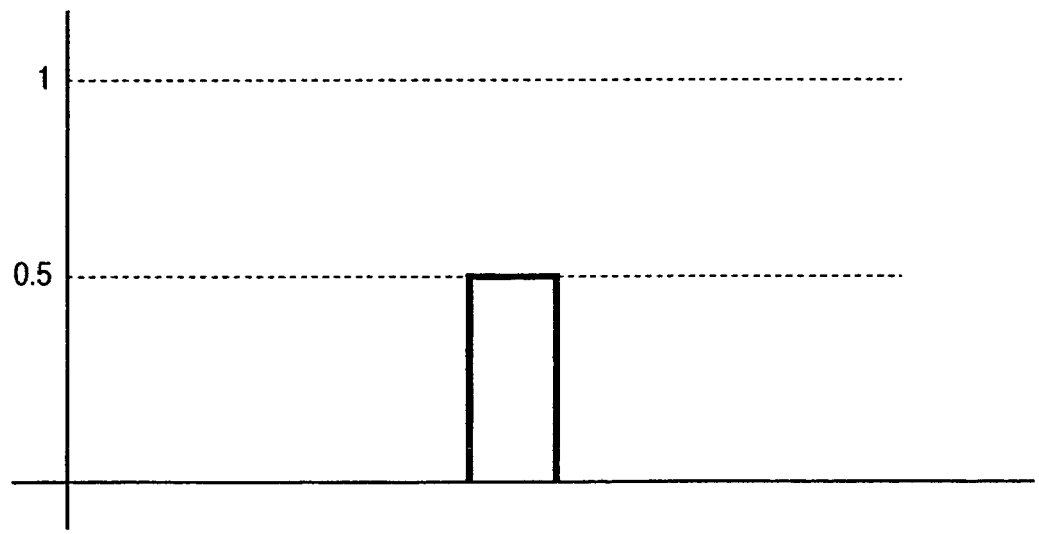
FIG. 14B is a graph for explaining the light amount change amount and light amount change ratio in the light amount distribution obtained by the sensor unit according to the first embodiment of the present invention.

From this calculation result, the change in pixel data is represented by a ratio, as shown in FIG. 14B. Even when the reflectance of the retroreflecting member 3 changes, the same processing can be executed, and the input can accurately be detected.

A threshold value Vthr is applied to the pixel data. Pixel numbers corresponding to the leading edge and trailing edge of the pixel data distribution corresponding to the light-shielded range are acquired. A central point between the two pixels is defined as the pixel corresponding to the input by the pointer. Accordingly, the input position of the pointer can more accurately be determined.

FIG. 14B is a schematic illustration for a descriptive convenience. Such a leading edge cannot be obtained in fact, and the respective pixels exhibit different data levels.

Details of a detection result obtained by applying equation (2) to the pixel data will be described next with reference to FIG. 15.

Figure 15:
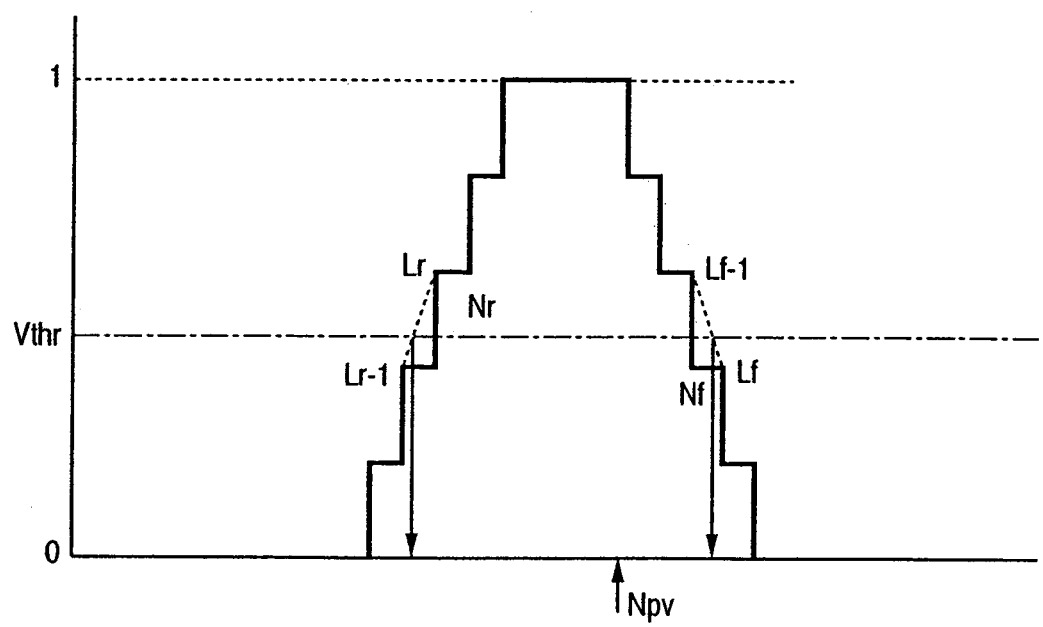
FIG. 15 is a graph showing details of a detection result according to the first embodiment of the present invention.

FIG. 15 is a graph showing details of a detection result according to this embodiment.

Referring to FIG. 15, the threshold value Vthr is set to detect the light-shielded range by the pointer. The leading edge portion of the pixel data distribution that crosses the threshold value Vthr indicates the Nrth pixel. The trailing edge portion indicates the Nfth pixel. At this time, a central pixel Np between the pixels is given by $$Np = Nr + (Nf - Nr)/2 \quad (3)$$

In this calculation, however, the pixel interval corresponds to the minimum resolution.

To more finely detect the light-shielded range, virtual pixel numbers which cross the threshold value Vthr are calculated by using the data level of each pixel and that of an immediately preceding adjacent pixel.

Let Lr be the data level of the Nrth pixel, $L_{r-1}$ be the data level of the $(N_{r-1})$th pixel, Lf be the data level of the Nfth pixel, and $L_{f-1}$ be the data level of the $(N_{f-1})$th pixel. Virtual pixel numbers Nrv and Nfv are given by $$Nrv=N_{r-1}+(Vthr-L_{r-1})/(Lr-Lr_4) \qquad (4)$$

$$Nfv=N_{f-1}+(Vthr-L_{f-1})/(Lf-Lf_1) \qquad (5)$$

A virtual central pixel Npv between the virtual pixel numbers Nrv and Nfv is given by $$Npv=Nrv+(Nfv-Nrv)/2 \qquad (6)$$

As described above, when virtual pixel numbers which cross the threshold value Vthr are calculated on the basis of the pixel numbers of pixels having data levels more than the threshold value Vthr, adjacent pixel numbers, and their data levels, detection with a higher resolution can be implemented.

To calculate the actual coordinate values of the pointer from the central pixel number representing the central point of the light-shielded range obtained by the above-described processing, the central pixel number must be converted into angle information.

In actual coordinate calculation processing to be described later, it is more convenient to obtain the value of tangent at that angle than the angle itself.

The pixel number is converted into tan θ by looking up a table or using transformation. Especially, when the optical system in the detection unit 40 has no aberration, linear transformation can be used. If aberration is present, the error of aberration can be removed by using a polynomial of higher degree.

The relationship between a pixel number and tan θ will be described with reference to FIG. 16.

Figure 16:
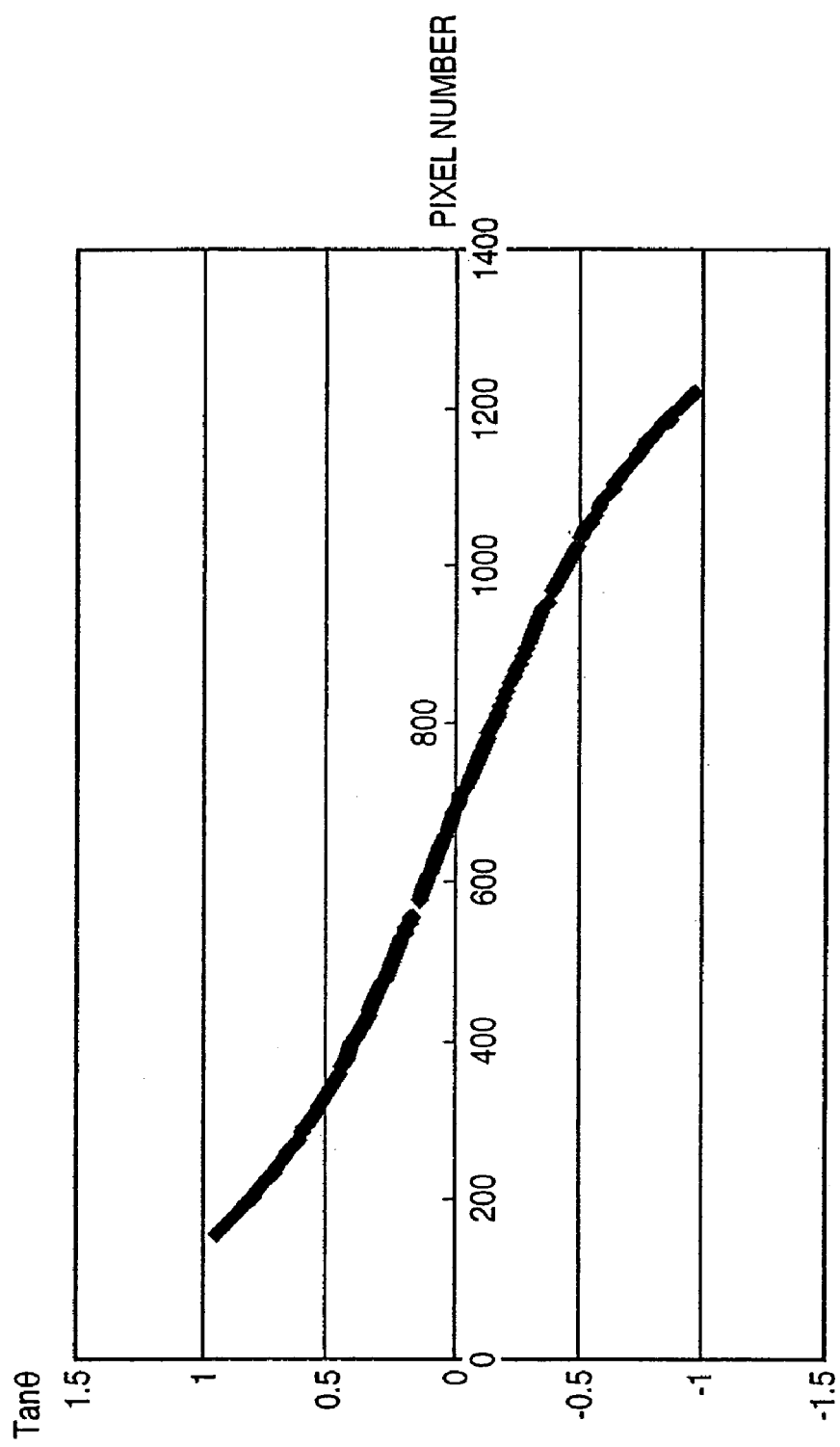
FIG. 16 is a graph showing the relationship between a value $\tan\theta$ and a pixel number in the first embodiment of the present invention.

FIG. 16 is a graph showing the relationship between a value tan θ and a pixel number in this embodiment.

On the basis of FIG. 16, an approximate expression to obtain tan θ from a pixel number is defined. A pixel number can be converted into tan θ by using the approximate expression (transformation).

As the transformation, a polynomial of higher degree is used, the accuracy can be ensured. The degree of the polynomial is determined in consideration of the calculation capability and accuracy specifications of the coordinate input apparatus.

For, e.g., a quintic polynomial, six coefficients are necessary. The coefficient data are stored in the memory 82 at the time of shipment.

Letting L5, L4, L3, L2, L1, and L0 be the coefficients of the quintic polynomial, tan θ is given by $$\tan \theta=(L5\times Npr+L4)\times Npr+L3)\times Npr+L2)\times Npr+L1)\times Npr+L0 \qquad (7)$$

When this calculation is executed for each pixel number detected by the line CCD 41 in the detection unit 40 of each of the sensor units 1L and 1R, corresponding angle data (tan θ) can be determined. In the above example, tan θ is obtained directly from the pixel number. Instead, the angle itself may be obtained from the pixel number first, and then, tan θ may be obtained.

<Description of Coordinate Calculation Method>

The position coordinates of the pointer are calculated from the angle data (tan θ) converted from the pixel number.

The positional relationship between the sensor units 1L and 1R and coordinates defined on the coordinate input region 4 will be described with reference to FIG. 17.

Figure 17:
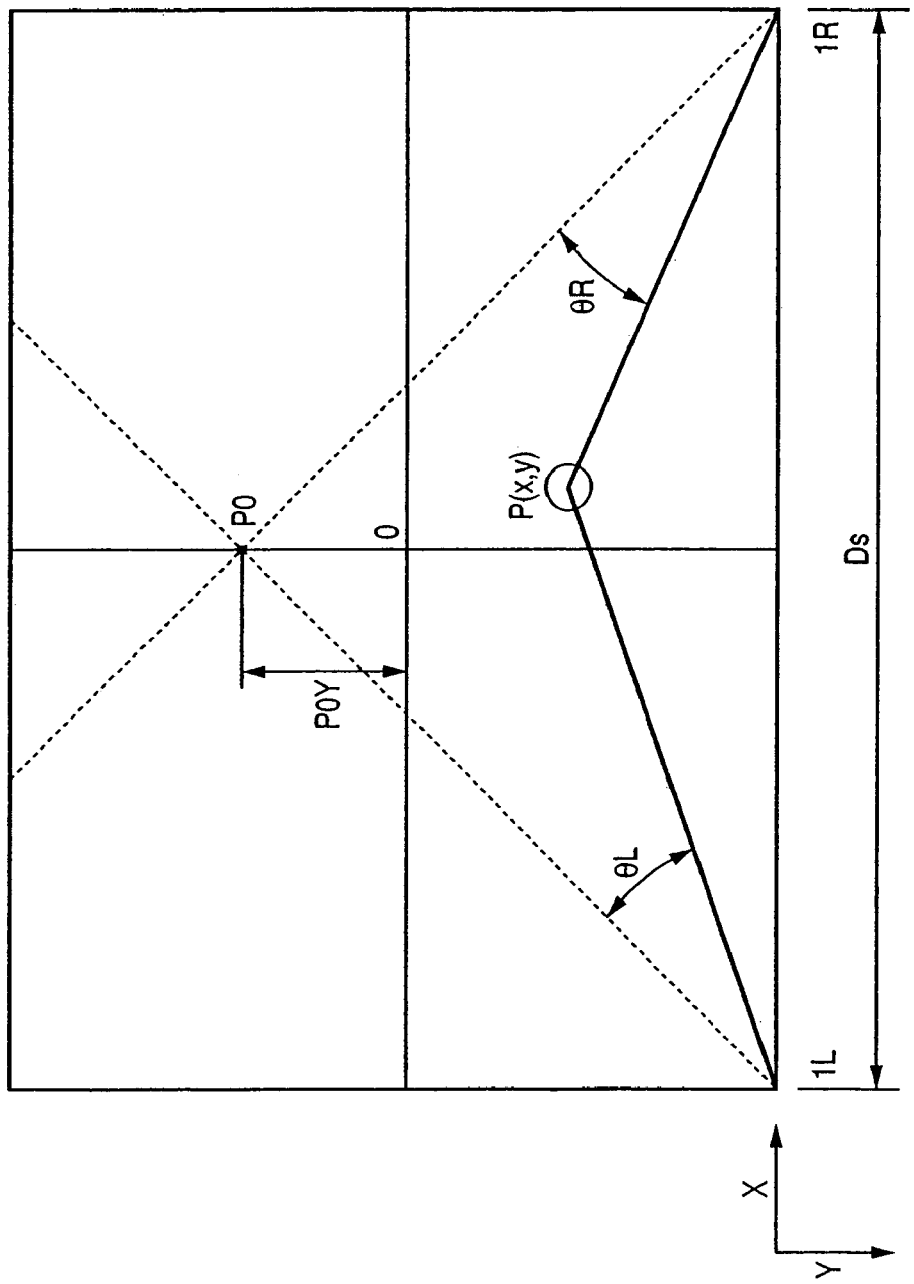
FIG. 17 is a view showing the positional relationship between the sensor units 1L and 1R and coordinates defined on the coordinate input region in the first embodiment of the present invention.

FIG. 17 is a view showing the positional relationship between the sensor units 1L and 1R and coordinates defined on the coordinate input region in this embodiment.

Referring to FIG. 17, the sensor units 1L and 1R are attached to the left and right of the lower side of the coordinate input range of the coordinate input region 4. The distance between the sensor units is represented by Ds.

The origin position is defined at the center of the coordinate input region 4. P0 is an intersection for the sensor units 1L and 1R at an angle of 0°.

Letting $\theta_L$ and $\theta_R$ be angles of the sensor units 1L and 1R, tan $\theta_L$ and tan $\theta_R$ are calculated by using equation (7).

At this time, the coordinates P(x,y) are given by $$x=Ds/2\times(\tan \theta_L+\tan \theta_R)/(1+(\tan \theta_L\times\tan \theta_R)) \qquad (8)$$

$$y=-Ds/2\times(\tan \theta_R-\tan \theta_L-(2\times\tan \theta_L\times\tan \theta_R))/(1+(\tan \theta_L\times\tan \theta_R))+P0Y \qquad (9)$$

<Switch Signal Detection>

With the above-described processing, the position coordinates of the pointer can be calculated from the angle information of the input point. The pieces of information to be transmitted to an external terminal such as a personal computer connected to the display device include, e.g., up/down information representing the up or down state of the pointer in the coordinate input region 4 and information which is input when the pen side switch 6a is pressed as well as the obtained position coordinate information. When these pieces of information are transmitted to the external terminal and processed, icon control, drawing, or character input can be executed.

Figure 18:
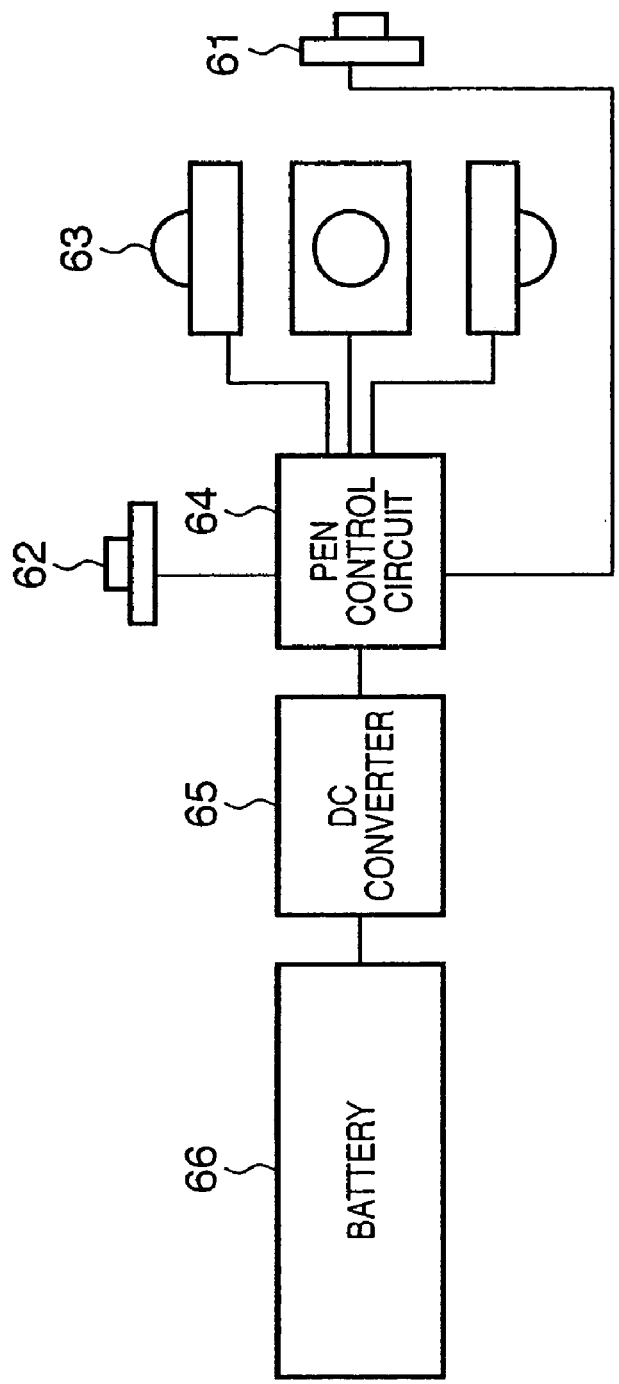
FIG. 18 is a view showing the arrangement of a light-emitting pen 6.

FIG. 18 is a view showing the arrangement of the light-emitting pen 6. The light-emitting pen 6 mainly includes a battery 66, DC/DC converter 65, pen control circuit 64, infrared LED 63, and switches 61 and 62.

The battery 66 functions as the power supply of the light-emitting pen 6. The voltage to be supplied is stepped up by the DC/DC converter 65 and supplied to the pen control circuit 64 and infrared LED 63.

The switch 61 is the switch 6b shown in FIG. 1 actually. The switch 62 is the pen side switch 6a shown in FIG. 1 actually. When the switch 61 or 62 is pressed, it transmits a signal (switch signal) representing that the switch is pressed to the pen control circuit 64.

Upon detecting the switch signal, the pen control circuit 64 causes the infrared LED 63 to emit light. While no switch signal is detected, the infrared LED 63 emits no light. That is, the pen control circuit 64 controls light emission of the infrared LED 63 on the basis of the presence/absence of the switch signal from the switch 61 or 62.

The switch signal is modulated by a predetermined frequency f so as not to be affected by disturbance.

Figure 19:
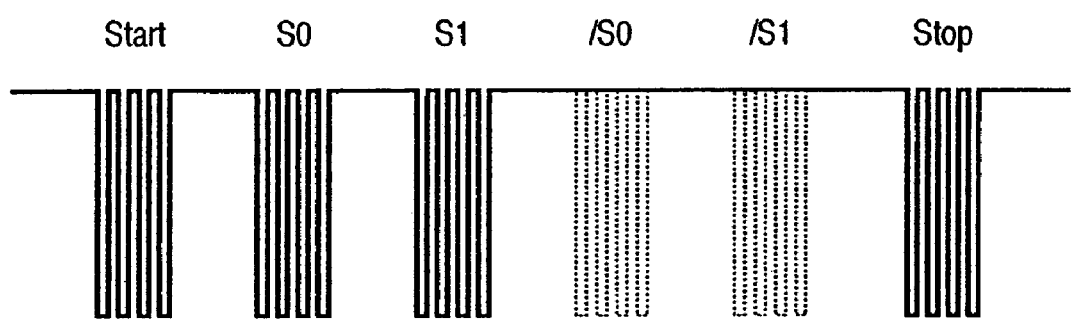
FIG. 19 is a view showing a signal sequence modulated by a predetermined frequency f.
Figure 20:
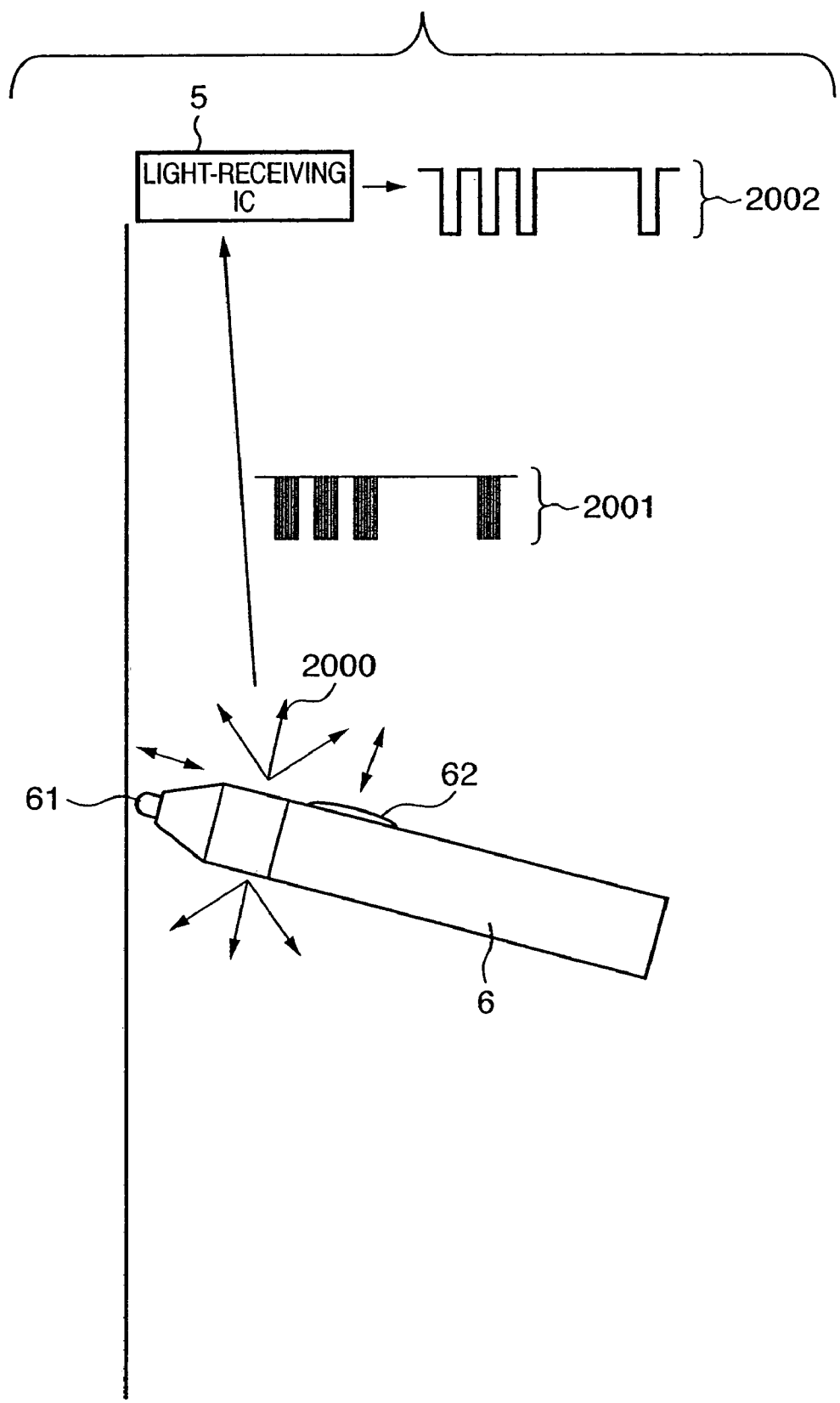
FIG. 20 is a view schematically showing processing for causing a light-receiving IC 5 to receive and demodulate modulated light emitted from the light-emitting pen 6.

FIG. 19 is a view showing a signal sequence modulated by the predetermined frequency f.

More specifically, the signal sequence contains a start bit signal ("Start" in FIG. 19), a pen-down switch signal S0 as a switch signal from the switch 61, a side switch signal S1 as a switch signal from the switch 62, inverted signals /S0 and /S1 of the signals S0 and S1, which are used to determine the authenticity of the data, and a stop signal ("Stop" in FIG. 19) representing the end of the signal. Each signal is modulated by the predetermined frequency f.

Such modulated light is demodulated by the light-receiving IC 5 and input to the sub CPU 89 as a bit sequence. FIG.

20 is a view schematically showing processing for causing the light-receiving IC 5 to receive and demodulate modulated light emitted from the light-emitting pen 6. When the switch 61 or 62 is pressed, the infrared LED 63 emits light, as described above. Modulated light 2000 is detected by the light-receiving IC 5 as a bit sequence 2001 and demodulated to a bit sequence 2002.

When the start bit is detected, the sub CPU 89 executes sampling at a predetermined period and determines 1 or 0 at each bit position. Accordingly, it is determined whether the logic of S0, /S0, and the like is correct or whether the stop bit is detected. If the logic is correct, the result is output. If the logic is wrong, the data is discarded, and detection is executed again.

In the actual coordinate input apparatus, however, the light projection timing of the light projecting unit 30 for pointer coordinate position detection and the light emission timing of the light-emitting pen 6 do not synchronize. Hence, the timings sometimes overlap.

Figure 21:
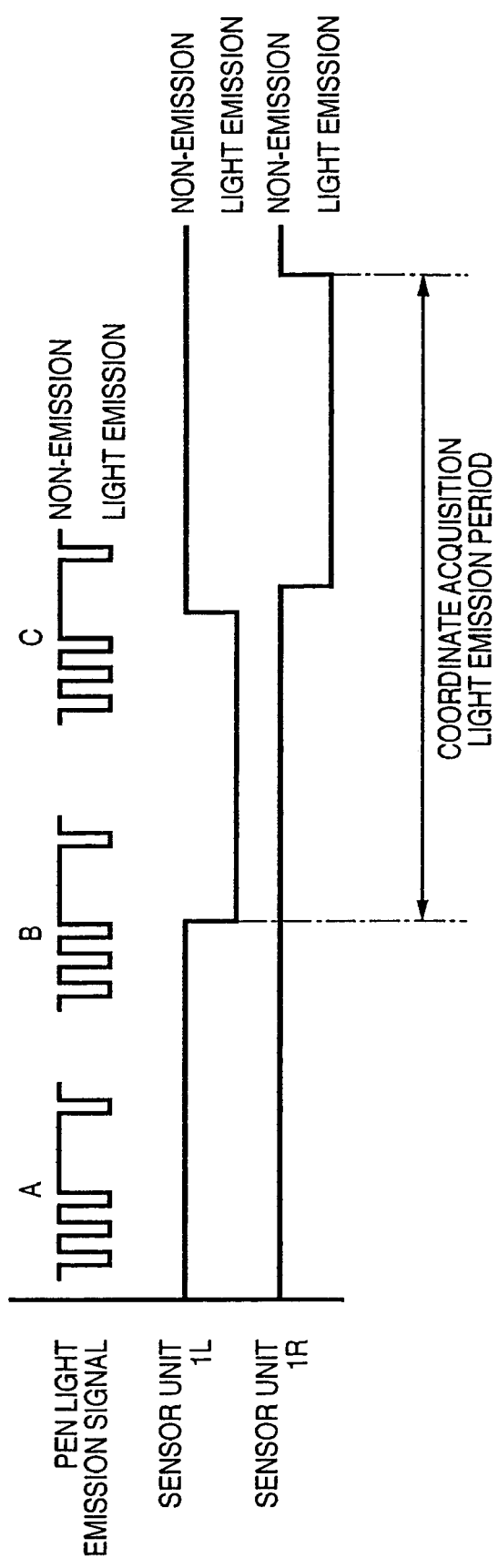
FIG. 21 is a timing chart showing the light emission timing of the light-emitting pen 6 and those of the sensor-units 1R and 1L.

FIG. 21 is a timing chart showing the light emission timing of the light-emitting pen 6 and those of the sensor units 1R and 1L. Referring to FIG. 21, A, B, and C denote signals (pen light emission signals) representing "light emission/non-emission of the infrared LED 63", which are output from the light-receiving IC 5. During the signal output period, the light-receiving IC 5 is executing processing for detecting light emission/non-emission of the infrared LED 63 in accordance with received light.

On the other hand, referring to FIG. 21, the light projecting units 30 of the sensor units alternately emit (project) light. The sum of the light projecting periods corresponds to the coordinate acquisition light emission period.

During the output period of the pen light emission signal A, neither of the light projecting units 30 of the sensor units 1R and 1L projects light. During the output period of the pen light emission signal B, the light projecting unit of the sensor unit 1L projects light. During the output period of the pen light emission signal C, both of the light projecting units 30 of the sensor units project light.

As described above, when the light projecting unit of the sensor unit projects light during the output period of the pen light emission signal, the coordinate position acquisition signal of the light-emitting pen 6 may be saturated or deform the waveform. This may lead to a detection error.

The pen light emission signal output period must be prevented from overlapping the light projecting period of the light projecting unit of the sensor unit. Control processing for this will be described below.

FIGS. 22A to 22C are timing charts for explaining the control processing. Referring to FIGS. 22A to 22C, a pen light emission signal 510 is output from the light-receiving IC 5. A coordinate position acquisition inhibition signal 511 inhibits the CPU 83 from acquiring the coordinate position of the pointer. When the sub CPU 89 receives the pen light emission signal from the light-receiving IC 5, the sub CPU 89 activates the signal during a predetermined period from the reception timing.

The coordinate position acquisition inhibition signal is switched to active/inactive in accordance with the presence/absence of reception of the pen light emission signal from the light-receiving IC 5 by the sub CPU 89, and output to the CPU 83. When the signal is active, the CPU 83 inhibits acquisition of the coordinate position of the pointer. "Inhibiting acquisition of the coordinate position" specifically means that processing for obtaining the coordinate position of the pointer is not executed.

A signal 512 is output from the CPU 83 to the light projecting unit 30 of the sensor unit to control light emission/non-emission of the light projecting unit 30 of the sensor unit 1R. A signal 513 is output from the CPU 83 to the light projecting unit 30 of the sensor unit to control light emission/non-emission of the light projecting unit 30 of the sensor unit 1L.

As described above, to acquire the coordinate position of the pointer, each sensor unit causes the light projecting unit 30 to project light every predetermined time. Before the light projection, the CPU 83 executes processing for checking whether the light-emitting pen 6 has emitted light. More specifically, the CPU 83 monitors the coordinate position acquisition inhibition signal output from the sub CPU 89. If the signal is not active, the CPU 83 controls the light projecting unit 30 of each sensor unit to start light projection and start the above-described pointer coordinate position acquisition processing. Referring to FIG. 22A, light projection by the light projecting unit 30 of the sensor unit 1R starts at a timing A.

When coordinate position acquisition processing is ended, the coordinate position acquisition inhibition signal is checked again. If the signal is not active, the acquisition operation is ended. The processing shifts to coordinate calculation.

As shown FIG. 22B, if the signal representing light emission of the light-emitting pen 6 is output from the light-receiving IC 5 at, e.g., a timing C1 or C2, i.e., immediately before light emission of the light projecting unit 30 of the sensor unit, the CPU 83 controls the light projecting unit 30 of the sensor unit to start light projection after the coordinate position acquisition inhibition signal is inactive.

In some cases, the signal representing light emission of the light-emitting pen 6 is output from the light-receiving IC 5 during light projection by the light projecting unit 30 of the sensor unit. In this case, referring to FIG. 22C, at a timing E, i.e., when the coordinate position acquisition inhibition signal is inactive, light projection by the light projecting unit 30 of the sensor unit can be started to start coordinate position acquisition processing. When the coordinate position acquisition inhibition signal that is checked after acquisition of the coordinate position (at a timing F in FIG. 22C) is active, the acquired coordinate position is discarded. The acquisition processing is executed again at, e.g., a timing G. With this processing, repetitive acquisition of coordinate position data can be avoided. In addition, coordinate position data whose accuracy decreases because of light emission of the light projecting unit 30 of the sensor unit can be discarded.

In this embodiment, the length of the period during which the coordinate position acquisition inhibition signal is active is set longer than the coordinate acquisition light emission period.

<Description of Control Flow>

FIG. 23 is a flowchart of processing for causing the coordinate input apparatus of this embodiment to obtain the coordinate position of the pointer. The processing according to the flowchart shown in FIG. 23 is executed by the CPU 83.

When the coordinate input apparatus is powered on, various kinds of initialization operations related to the coordinate input apparatus are executed in step S102, including port setting of the control/arithmetic unit 2 and timer setting.

In step S103, the number of times of initial read for the initial read operation of the line CCD 41 is set.

The initial read operation is an operation to remove unnecessary charges of the line CCD 41 at the time of activation of the coordinate input apparatus. The line CCD 41 sometimes accumulate unnecessary charges in an inoperative state. If the coordinate input operation is executed without removing the charges, detection may be impossible, or a detection error occurs. To avoid this, in step S103, in a state wherein light projection by the light projecting unit 30 is stopped, the read operation is executed a predetermined number of times, thereby removing unnecessary charges.

In step S104, the read operation of the line CCD 41 is executed. In step S105, it is determined whether the read is executed a predetermined number of times or more. If the read is not executed a predetermined number of times or more (NO in step S105), the flow returns to step S104. When the read is executed a predetermined number of times or more (YES in step S105), the flow advances to step S106.

In step S106, the pixel data (Bas_data[N]) of the line CCD 41 in the state wherein light projection by the light projecting unit 30 is stopped is received as first reference data. In step S107, the first reference data is stored in the memory 82.

In step S108, the pixel data (Ref_data[N]) of the line CCD 41 in the state wherein light projection by the light projecting unit 30 is executed is received as second reference data. In step S109, the second reference data is stored in the memory 82.

The above processing is the initial operation at the time of power-on. An operation for the input by the pointer is executed subsequently.

In step S110, the coordinate position acquisition inhibition signal is checked to determine whether the signal is active, i.e., whether the light-emitting pen 6 is emitting light. Only when the signal is inactive, the processing advances to step S111.

In step S111, in the coordinate input sampling state, the normal read operation of the line CCD 41 is executed to receive pixel data (Norm_data[N]). After reception, the coordinate position acquisition inhibition signal is checked again in step S112 to determine whether the signal is active. Only when the signal is inactive, the processing advances to step S113.

In step S113, the difference value between the second reference data (Ref_data[N]) and the pixel data (Norm_data[N]) is calculated. In step S114, the presence/absence of input by the pointer is determined on the basis of the difference value.

If no input is detected (NO in step S114), the flow returns to step S110. If input is detected (YES in step S114), the flow advances to step S115.

When the repetitive period at this time is set to about 10 [msec], sampling is executed at 100 times/sec.

In step S115, the pixel data change ratio is calculated by using equation (2). In step S116, the leading edge portion and trailing edge portion are determined on the basis of a threshold value for the ratio calculated in step S115. A central pixel number representing the central point of the light-shielded range is obtained by using equations (4) to (6).

In step S117, Tan θ is calculated from the determined central pixel number and equation (7).

In step S118, the input coordinates P(x,y) of the pointer are calculated by using equations (8) and (9) from the value Tan θ for the sensor units 1L and 1R.

In step S119, it is determined whether the input by the pointer is touch-down input. In this embodiment, when the sub CPU 89 receives the signal representing that the switch 61 of the light-emitting pen 6 is pressed, the CPU 83 accordingly sets the down flag (step S120) or cancel the down flag (step S121).

On the basis of this determination method, if it is determined in step S119 that the input by the pointer is touch-down input (YES in step S119), the flow advances to step S120 to set the down flag representing the touch-down input. On the other hand, if the input by the pointer is not touch-down input (NO in step S119), the flow advances to step S121 to cancel the down flag.

In step S122, the down flag state and the calculated coordinate values are output to an external terminal. In the external terminal, for example, cursor movement or a change of the mouse button state is done on the basis of the received coordinate values and down flag state.

When the processing in step S120 is ended, the flow returns to step S110. The above processing is repeated until power-off.

As described above, according to this embodiment, even when a pointer which emits light is used, the coordinate position of the pointer can be obtained without any influence of the light. Hence, the coordinate position of the pointer can more accurately be detected.

Second Embodiment

In the first embodiment, the length of the period during which the coordinate position acquisition inhibition signal is active is set longer than the coordinate acquisition light emission period.

If a CPU 83 has a sufficient processing capability, i.e., the CPU 83 is sufficiently capable of always checking the coordinate position acquisition inhibition signal, and a switch signal as shown in FIG. 19 is used, the length of the period during which the coordinate position acquisition inhibition signal is active can be set equal to the length from the start bit signal to the stop bit signal.

Figure 24:
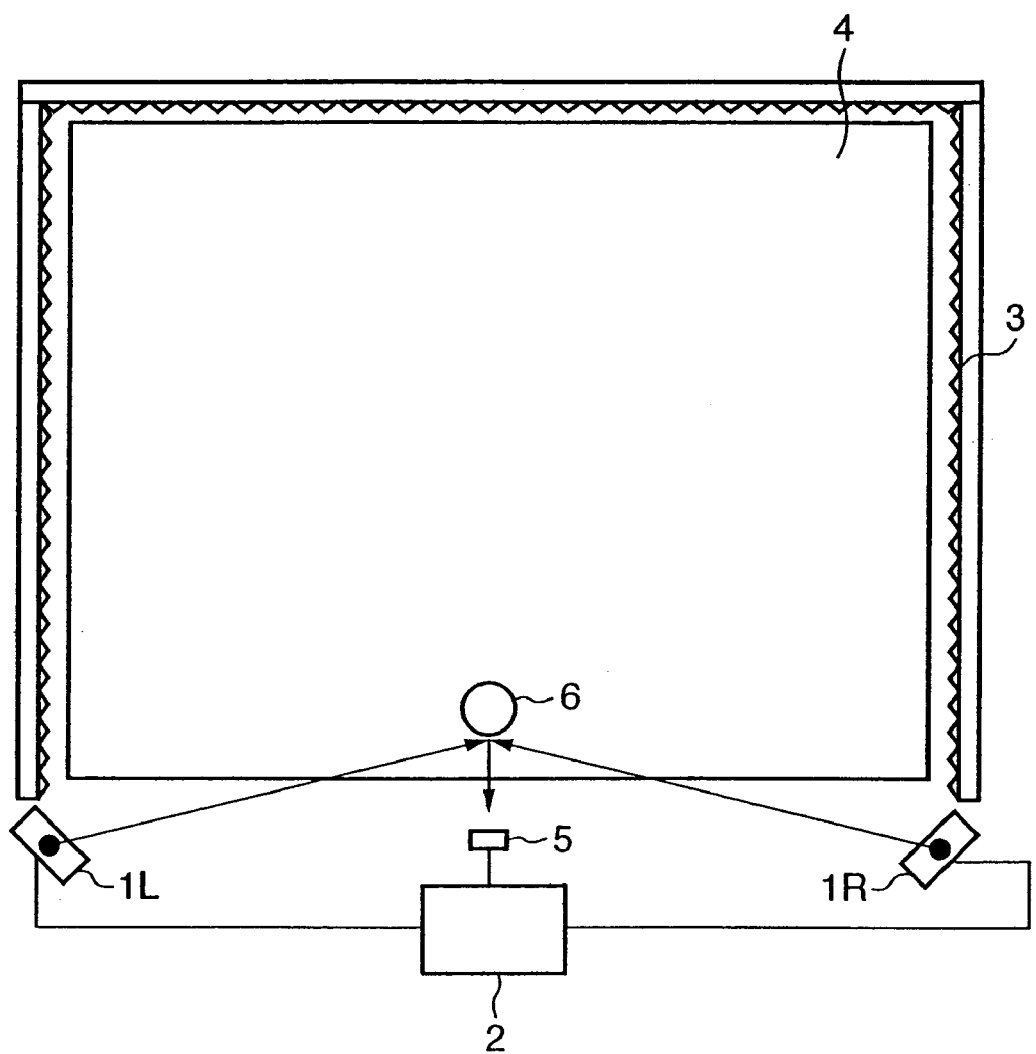
FIG. 24 is a view showing a case in which the light-emitting pen 6 is located near the light-receiving IC 5 in the coordinate input apparatus having the arrangement shown in FIG. 1.

In addition to overlap of the switch signal and the coordinate acquisition light emission period, light emission for coordinate acquisition can also affect detection of the switch signal. FIG. 24 is a view showing a case in which a light-emitting pen 6 is located near a light-receiving IC 5 in the coordinate input apparatus having the arrangement shown in FIG. 1.

As shown in FIG. 24, since each sensor unit and the light-receiving IC 5 face the same point, light projected from a sensor unit is rarely detected by the light-receiving IC 5. However, when the light-emitting pen 6 is located near the light-receiving IC 5, the light projected from the sensor unit may be scattered and reflected by the light-emitting pen 6, and the scattered and reflected light may partly be detected by the light-receiving IC 5.

The light-receiving IC 5 which detects a modulated switch signal is designed to be sensitive to modulated light. However, light emitted from the sensor unit has a high-frequency characteristic at its leading and trailing edges. This may cause the light-receiving IC 5 to operate.

Figure 25:
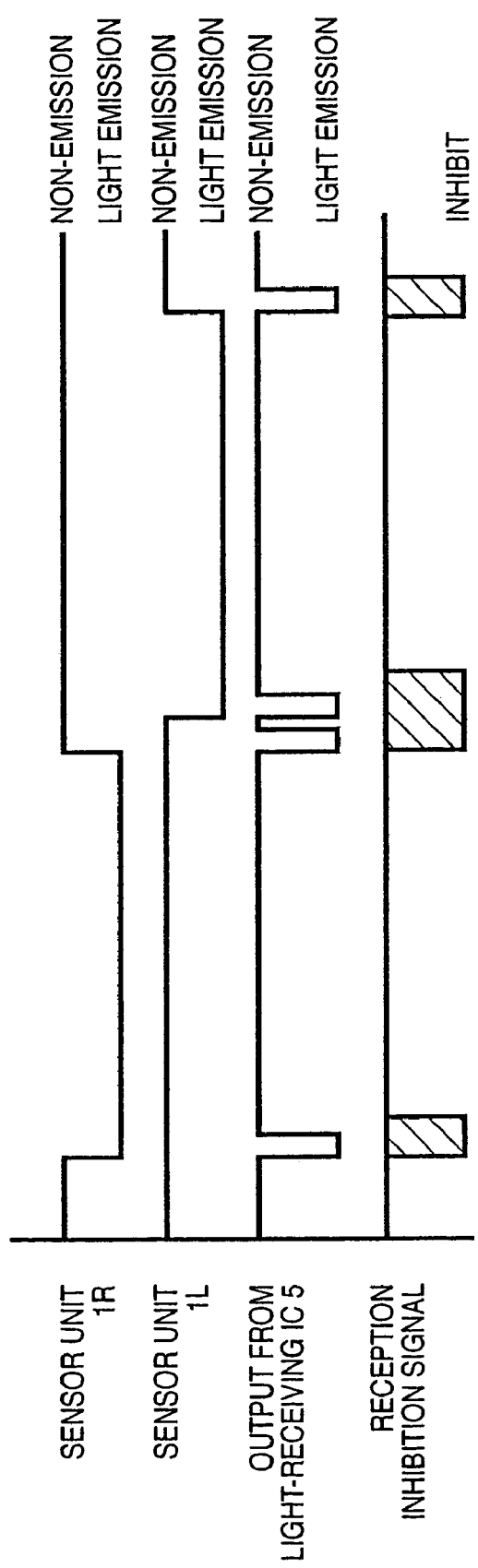
FIG. 25 is a timing chart showing the output signals from the sensor units and light-receiving IC 5 when the light-emitting pen 6 is located near the light-receiving IC 5.

FIG. 25 is a timing chart showing the output signals from the sensor units and light-receiving IC 5 in this case. As shown in FIG. 25, immediately after light projection from each sensor unit, the light-receiving IC 5 outputs a signal representing light detection (light emission). The light-receiving IC 5 detects light simultaneously with light projection of the sensor units. As a result, the coordinate position acquisition inhibition signal is always active. That is, coordinate acquisition cannot be performed.

To avoid this, the CPU 83 inputs a signal to control light emission/non-emission of a light projecting unit 30 of the sensor unit to a sub CPU 89. The sub CPU 89 inhibits reception of the output from the light-receiving IC 5 only during a predetermined period at the leading and trailing edges of this signal.

Referring to FIG. 25, a reception inhibition signal inhibits the sub CPU 89 from receiving the output from the light-receiving IC 5 only during a predetermined period (shaded period) (corresponding to the characteristic of the light-receiving IC 5) at the leading and trailing edges of the signal to control light emission/non-emission of the light projecting unit 30 of the sensor unit. The sub CPU 89 outputs this signal to itself and switches reception/non-reception of the output from the light-receiving IC 5 in accordance with this signal. Accordingly, the above-described problem can be solved.

The reception inhibition signal may be transmitted to the light-receiving IC 5 so that the light-receiving IC 5 can stop detecting light only during the predetermined period (shaded period) (corresponding to the characteristic of the light-receiving IC 5) at the leading and trailing edges of the signal to control light emission/non-emission of the light projecting unit 30 of the sensor unit.

As described above, the signal to control light emission/non-emission of the light projecting unit 30 of the sensor unit is input to the sub CPU 89 so that the timing of the coordinate acquisition inhibition period is decided, as needed, on the basis of the signal. Accordingly, even in a system which controls the light amount by controlling the light emission period, the inhibition time is automatically adjusted, and more stable coordinate acquisition can be executed.

Third Embodiment

In the above-described embodiments, the light-receiving IC 5 and sensor units are separate devices and can independently be installed toward different directions. In this arrangement, an arrangement which controls the direction of light emitted from a light-emitting pen 6 to the side of a light-receiving IC 5 can be implemented. As a result, light projected to the sensor units can be suppressed.

Figure 26:
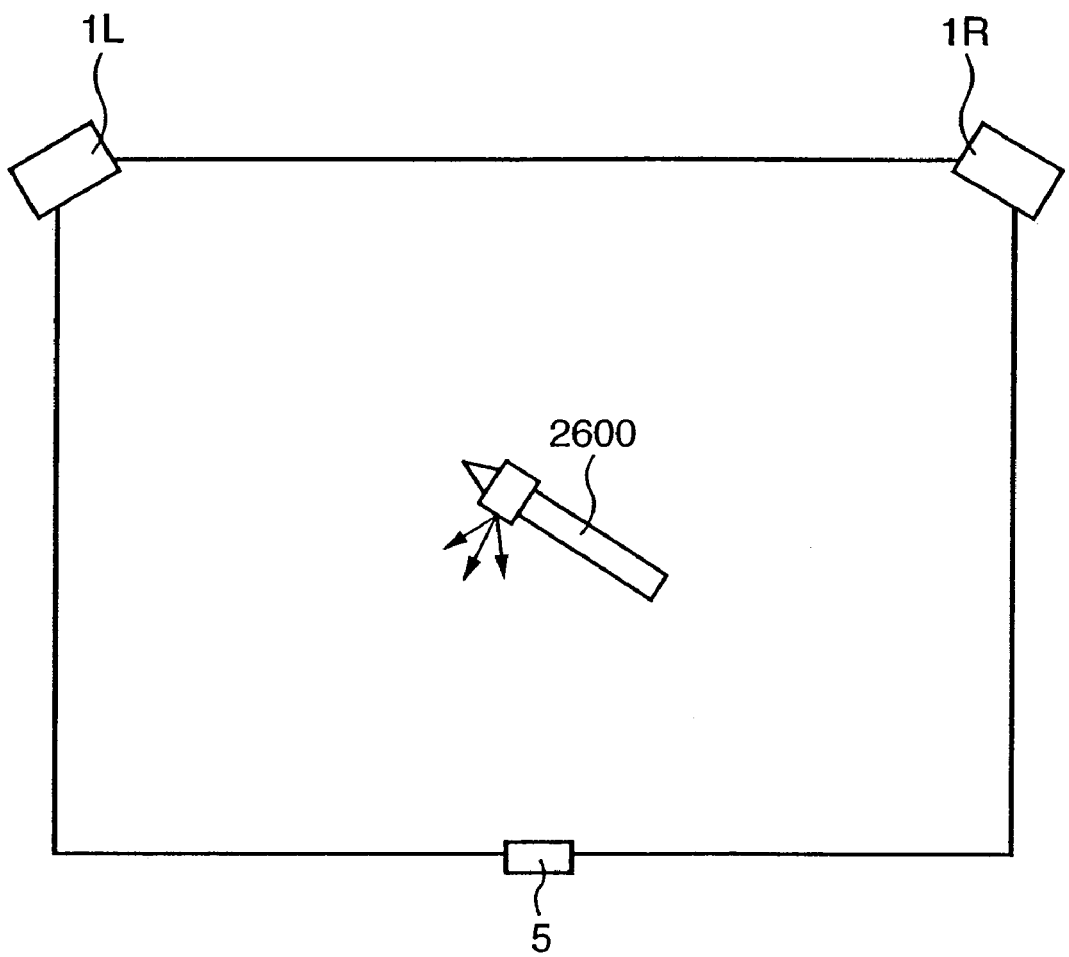
FIG. 26 is a schematic view of a coordinate input apparatus which uses a light-emitting pen having an arrangement that projects light to the installation direction of the light-receiving IC 5.

FIG. 26 is a schematic view of a coordinate input apparatus which uses a light-emitting pen having an arrangement that projects light to the installation direction of the light-receiving IC 5. As shown in FIG. 26, in this embodiment, the sensor units are installed on the upper side, and the light-receiving IC 5 is installed on the lower side. A light-emitting pen 2600 projects light to only the side of the light-receiving IC 5.

Figure 29B:
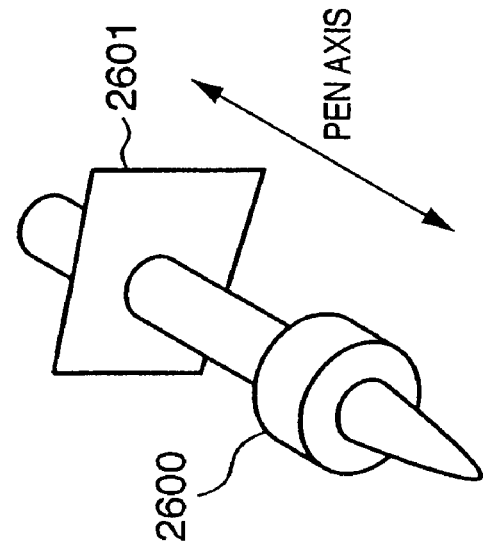
FIG. 29B is a view for explaining the outer appearance of the light-emitting pen 2600.
Figure 29A:
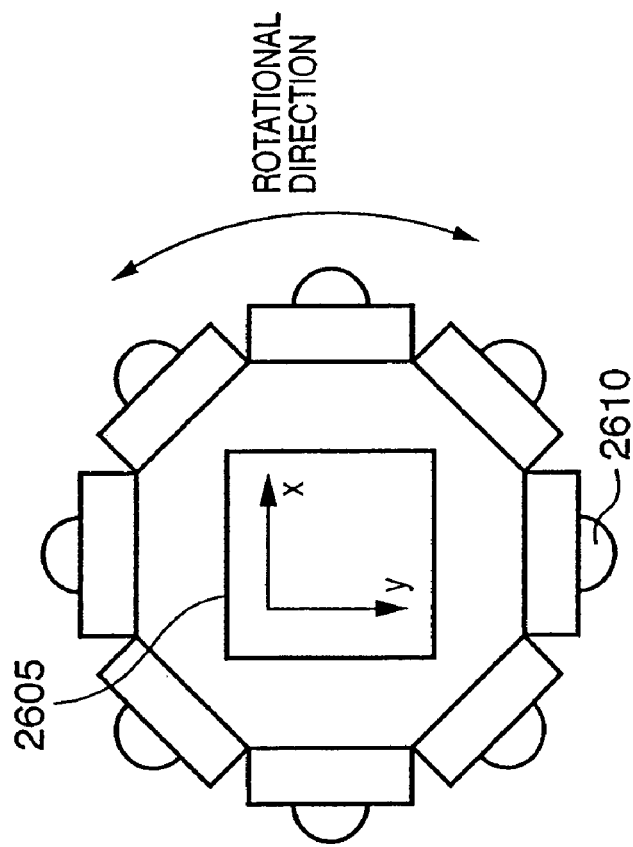
FIG. 29A is a view for explaining the internal structure of the light-emitting pen 2600.

A biaxial (x- and y-axes) acceleration sensor is arranged in the light-emitting pen 2600. An acceleration of gravity is detected by the acceleration sensor, thereby detecting the rotational direction of the light-emitting pen 2600 with respect to the axis of rotation. FIG. 29A is a schematic sectional view of the internal structure of the light-emitting pen 2600 taken along a plane 2601 perpendicular to the pen axis, as shown in FIG. 29B.

Referring to FIG. 29A, an acceleration sensor 2605 can detect the rotational direction of the light-emitting pen 2600 by a known technique even when the light-emitting pen 2600 rotates in the rotational direction indicated by the arrow.

LEDs 2610 corresponding to one revolution are arranged on the surface of the light-emitting pen 2600. The LEDs 2610 are independently driven by the controller in the light-emitting pen 2600. More specifically, only LEDs instructed to emit light emit light.

Figure 27:
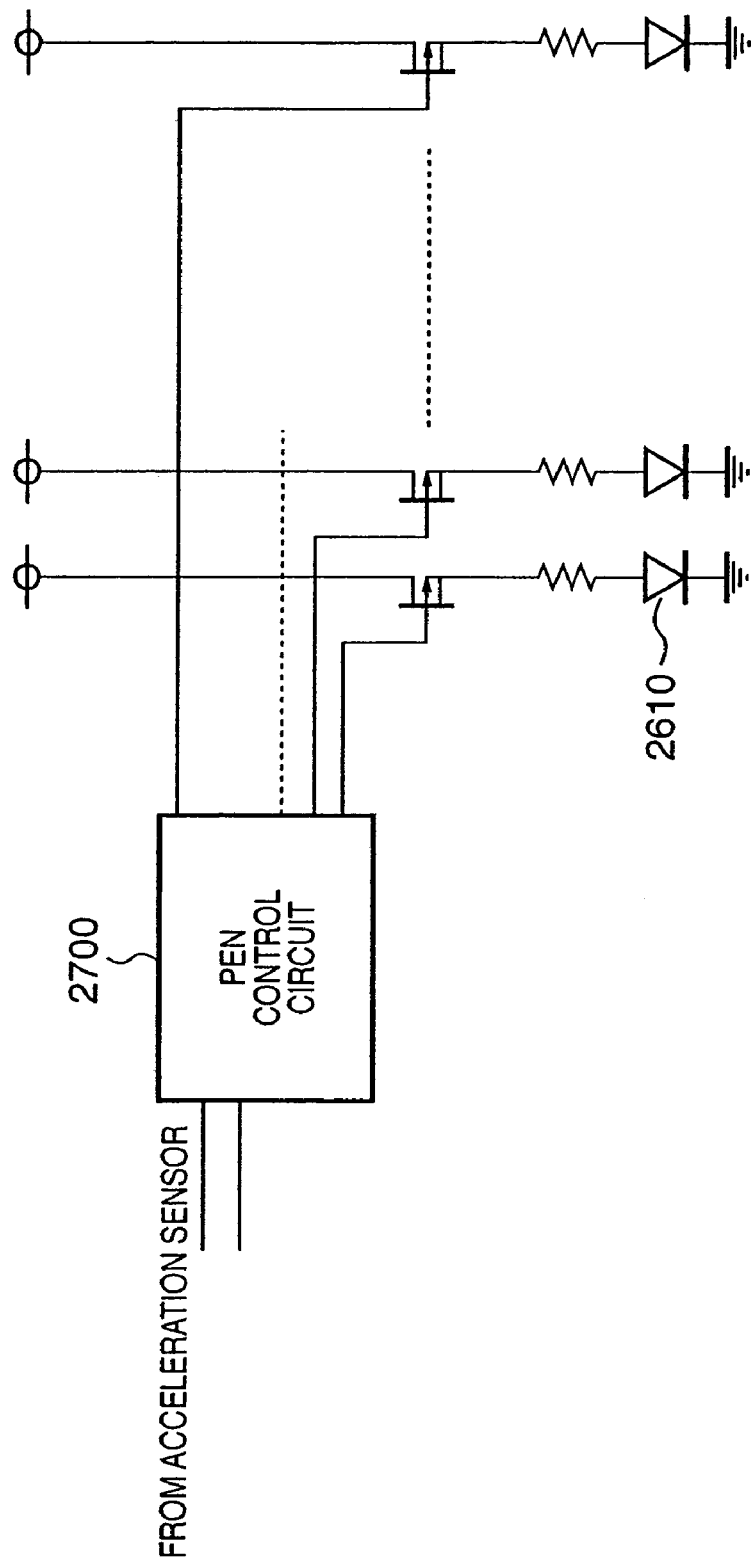
FIG. 27 is a view showing the arrangement of a light-emitting pen 2600.

FIG. 27 is a view showing the arrangement of the light-emitting pen 2600. A pen control circuit 2700 functions as the controller and also executes processing for obtaining the rotational direction on the basis of a signal from the acceleration sensor 2605, which indicates the rotational direction. As described above, the LEDs 2610 are independently controlled by the pen control circuit 2700 so that they can independently emit light.

In the above arrangement, data which represents the direction of the light-receiving IC 5 viewed from an LED serving as a reference (to be referred to as a reference LED hereinafter) of the plurality of LEDs is stored in a memory in the pen control circuit 2700. The acceleration sensor 2605 detects the rotational direction of the reference LED and inputs a signal representing the detection result to the pen control circuit 2700. The pen control circuit 2700 can obtain the rotational direction of the reference LED on the basis of the signal.

The pen control circuit 2700 specifies LEDs on the side of the light-emitting pen 2600 on the basis of the LED rotational direction detected by the acceleration sensor 2605 and causes only the specified LEDs to emit light. Accordingly, the LEDs can emit light toward only the light-receiving IC 5 so that the influence on the sensor units can be reduced.

Figure 28:
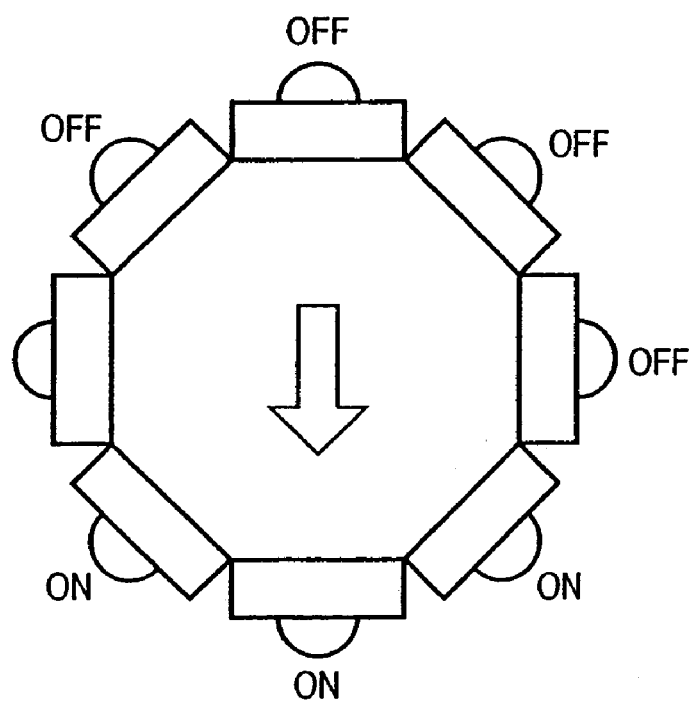
FIG. 28 is a view showing a state in which only LEDs on the side of the light-receiving IC 5 are caused to emit light on the basis of the direction detected by the acceleration sensor 2605.

FIG. 28 is a view showing a state in which only LEDs on the side of the light-receiving IC 5 are caused to emit light on the basis of the direction detected by the acceleration sensor 2605. Referring to FIG. 28, the light-receiving IC 5 is present in the direction of the arrow. Hence, only the LEDs on that side emit light (ON). The remaining LEDs do not emit light (OFF).

In this arrangement, only the LEDs on the side of the light-receiving IC 5 emit light. For this reason, the power consumption can be lower than in an arrangement that causes all LEDs to emit light.

In this embodiment, the rotational direction is detected by using the acceleration sensor, and only LEDs on the side of the light-receiving IC 5 are caused to emit light on the basis of the detected direction. Instead, LEDs to be caused to emit light may be determined by another means.

For example, a plurality of photosensors are arranged on the light-emitting pen 2600. The direction of the light-receiving IC 5 relative to the light-emitting pen 2600 is detected on the basis of the positional relationship between sensors that have detected light. LEDs to be caused to emit light are determined on the basis of the detected direction and the predetermined positional relationship between the sensor units and the light-receiving IC 5.

Other Embodiment

The object of the present invention can also be achieved by supplying a recording medium (or a storage medium) which records software program codes for implementing the functions of the above-described embodiments to a system or apparatus and causing the computer (or a CPU or MPU) of the system or apparatus to read out and execute the program codes stored in the recording medium. In this case, the program codes read out from the recording medium implement the functions of the above-described embodiments by themselves, and the recording medium which records the program codes constitutes the present invention.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the recording medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the recording medium, program codes corresponding to the above-described flowchart are stored in the recording medium.

As many apparently widely different embodiments of the present-invention can be made without departing from the spirit and scope thereof, it is to be understood that the invention is not limited to the specific embodiments thereof except as defined in the claims.

CLAIM OF PRIORITY

This application claims priority from Japanese Patent Application No. 2003-289153 filed on Aug. 7, 2003, which is hereby incorporated by reference herein.

What is claimed is:

1. A coordinate input apparatus including light-emitting means for projecting light to a coordinate input region, reflection means arranged at a peripheral portion of the coordinate input region, for recursively reflecting light emitted from said light-emitting means, light-receiving means arranged in the coordinate input region, for receiving light reflected by said reflection means, and calculation means for executing a coordinate acquisition operation for obtaining a position where light is shielded in the coordinate input region as a coordinate position of a pointer having a light-emitting function in the coordinate input region, on the basis of a light amount distribution obtained from said light-receiving means, comprising:

detection means for detecting, as a light emission signal, light emitted from the pointer; and control means for controlling the coordinate acquisition operation by said calculation means on the basis of a detection result by said detection means, wherein said control means controls to inhibit said calculation means from executing the coordinate acquisition operation during a predetermined period after said detection means detects the light emission signal transmitted from the pointer.

2. The apparatus according to claim 1, wherein said control means controls to inhibit the light-emitting means from projecting light during a predetermined period after said detection means detects the light emission signal from the pointer.

3. The apparatus according to claim 1, wherein a length of the predetermined period is longer than the period when said light-emitting means projects light for coordinate detection of the pointer.

4. The apparatus according to claim 1, wherein said control means controls to inhibit the calculation means from executing the coordinate acquisition operation during only a predetermined period from a start of light emission by the light-emitting means and during only a predetermined period from an end of light emission.

5. The apparatus according to claim 1, wherein the pointer emits light to a side of the light-receiving means.

6. The apparatus according to claim 1, further comprising display means, said display means being superposed on the coordinate input region.

7. A coordinate input method of a coordinate input apparatus including light-emitting means for projecting light to a coordinate input region, reflection means arranged at a peripheral portion of the coordinate input region, for recursively reflecting light emitted from said light-emitting means, light-receiving means arranged in the coordinate input region, for receiving light reflected by said reflection means, and calculation means for executing a coordinate acquisition operation for obtaining a position where light is shielded in the coordinate input region as a coordinate position of a pointer having a light-emitting function in the coordinate input region, on the basis of a light amount distribution obtained from said light-receiving means, the method comprising:

a detection step of detecting, as a light emission signal, light emitted from the pointer; and a control step of controlling the coordinate acquisition operation by said calculation means on the basis of a detection result in the detection step, wherein said control step controls to inhibit said calculation means from executing the coordinate acquisition operation during a predetermined period after said detection step detects the light emission signal transmitted from the pointer.

8. A computer-executable program, stored on a computer-readable storage medium, for causing a computer to execute a coordinate input method of claim 7.

9. A computer-readable storage medium which stores a program of claim 8.

* * * * *

UNITED STATES PATENT AND TRADEMARK OFFICE
CERTIFICATE OF CORRECTION

| | |
|---|---|
| PATENT NO. | : 7,375,720 B2 |
| APPLICATION NO. | : 10/910270 |
| DATED | : May 20, 2008 |
| INVENTOR(S) | : Tanaka |

It is certified that error appears in the above-identified patent and that said Letters Patent is hereby corrected as shown below:

<u>COLUMN 11</u>:
      In equation (4), "$(Lr-Lr_4)$" should read -- $(Lr-L_{r-1})$ --; and
      In equation (5), "$(Lf-Lf_1)$" should read -- $(Lf-L_{f-1})$ --.

Signed and Sealed this

Fourth Day of November, 2008

JON W. DUDAS
*Director of the United States Patent and Trademark Office*